(12) United States Patent
Nakamura

(10) Patent No.: US 7,663,815 B2
(45) Date of Patent: Feb. 16, 2010

(54) IMAGING LENS

(75) Inventor: Akira Nakamura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 86 days.

(21) Appl. No.: 12/152,050

(22) Filed: May 12, 2008

(65) Prior Publication Data

US 2009/0034099 A1 Feb. 5, 2009

(30) Foreign Application Priority Data

May 22, 2007 (JP) ............................. 2007-135565

(51) Int. Cl.
*G02B 9/34* (2006.01)
(52) U.S. Cl. ..................... 359/773; 359/715; 359/740; 359/771
(58) Field of Classification Search ................ 359/715, 359/740, 771, 773
See application file for complete search history.

(56) References Cited

U.S. PATENT DOCUMENTS

| | | | | |
|---|---|---|---|---|
| 6,813,099 B2 * | 11/2004 | Yamaguchi | ................ | 359/772 |
| 7,295,386 B2 * | 11/2007 | Taniyama | ................... | 359/773 |
| 7,345,830 B2 * | 3/2008 | Shinohara | ................... | 359/715 |
| 7,545,587 B2 * | 6/2009 | Kubota | ....................... | 359/774 |
| 2006/0238898 A1* | 10/2006 | Shinohara | ................... | 359/771 |
| 2007/0081258 A1* | 4/2007 | Huang | ........................ | 359/715 |

FOREIGN PATENT DOCUMENTS

| | | |
|---|---|---|
| DE | 10 2005 015 145 | 10/2006 |
| EP | 1 531 353 | 5/2005 |
| EP | 1 712 944 | 10/2006 |
| JP | 2004-325713 | 11/2004 |

* cited by examiner

*Primary Examiner*—Evelyn A. Lester
(74) *Attorney, Agent, or Firm*—William L. Androlia; H. Henry Koda

(57) ABSTRACT

It is to provide a large-diameter imaging lens that can suppress reduction of peripheral light amount, achieve size and weight reduction, and maintain excellent optical performance.

The imaging lens comprises, in order from an object side to an image surface side, a first lens having a positive power whose convex surface faces the image surface side, a diaphragm, a second lens having a negative power whose convex surface faces the image surface side, a third lens having a positive power, and a fourth lens having a negative power, wherein conditions expressed by $0.3 \leq f/f_1 \leq 1.7$ and $-2.7 \leq f/f_2 \leq -0.25$ (where, f: focal distance of the entire lens system, $f_1$: focal distance of the first lens, and $f_2$: focal distance of the second lens) are to be satisfied.

5 Claims, 29 Drawing Sheets

IMAGING LENS

BACKGROUND OF THE INVENTION

1. Field of the Invention

The present invention relates to an imaging lens. In particular, the present invention relates to an imaging lens having a four-lens structure that is suitable for forming an image of an object on an image-taking surface of an image sensor element, such as a charge-coupled device (CCD) and a complementary metal oxide semiconductor (CMOS), mounted on a portable computer, a television phone, a portable phone, a digital camera, a monitoring camera for a vehicle, and the like.

2. Description of the Related Art

In recent years, there has been an increasing demand for cameras that utilize an image sensor element (solid image sensor element), such as the CCD and the CMOS, mounted on a portable computer, a television phone, a portable phone, a digital camera, a monitoring camera for a vehicle, and the like. It is demanded that a camera such as this is small and light because the camera is required to be mounted on a limited installation space.

A solid image sensor element having a high resolution of about 300 thousand pixels, called video graphics array (VGA), and a solid image sensor element having a higher resolution of one million pixels or more are being used as the solid image sensor element mounted on cameras such as those described above.

Therefore, like the cameras, the imaging lens used in such cameras is required to be small and light and to have a high resolution. Conventionally, a four-lens structure lens system using four lenses, such as those described in Patent Literature 1 to Patent Literature 3, is used to meet these demands.

[Patent Literature 1] Japanese Patent Unexamined Publication

[Patent Literature 2] Japanese Patent Unexamined Publication 2004-341512

[Patent Literature 3] Japanese Patent Unexamined Publication 2002-365531

It is important that the monitoring camera for a vehicle and the like, in particular, can also image a subject in a dark environment, such as outside at night, with adequate exposure. Therefore, the camera is required to have a high dynamic range (dB). A lens mounted on such a camera having a high dynamic range is preferably a bright lens with a large diameter in which reduction in the amount of light is minimal even at its periphery.

However, in the lens system described in Patent Literature 1, a diaphragm is disposed closest to an object side. Therefore, although the lens system is ideal for actualizing a compact lens system in which an incident angle of a light beam incident on an image-taking surface is small, asymmetry of the lens system increases. Therefore, from the perspective of aberration correction, the configuration is not particularly suitable for a large diameter lens system having a large effective diameter. This is because many kinds of aberrations (such as coma aberration and astigmatism) are affected by the effective diameter of a lens.

In the lens system described in Patent Literature 2, a first lens is a lens having a strong convex surface that faces the object side. Therefore, peripheral vignetting (aperture efficiency) may decrease.

Here, when an effect caused by distortion is ignored, the amount of light in the periphery (referred to, hereinafter, as peripheral light amount) is calculated by the fourth power of the cosine of the angle of field ($\cos^4\omega$) being multiplied with a vignetting value. Therefore, in the lens system described in Patent Literature 2 having a small peripheral vignetting value, decrease in the peripheral light amount is difficult to suppress.

Moreover, in the lens system described in Patent Literature 3, a second lens is a biconcave lens. Therefore, although the lens system is effective in terms of increasing negative power and reducing a Petzval sum, the incident angle of the light beam entering the image surface side away from the diaphragm increases, and various aberrations such as astigmatism frequently occur. Therefore, the lens system is particularly disadvantageous for a large diameter lens system having a large effective diameter.

In this way, conventionally, in a bright, large-diameter lens system, it is difficult to maintain balance among suppressing the decrease in the peripheral light amount, reducing the size and weight of the lens system, and maintaining excellent optical performance by the incident angle of the light beam incident on the image-taking surface being relaxed or the various aberrations being corrected.

SUMMARY OF THE INVENTION

The present invention has been achieved in light of the above-described problems. An object of the invention is to provide a large-diameter imaging lens that can suppress decrease in peripheral light amount, actualize size and weight reduction, and maintain excellent optical performance.

In order to achieve the aforementioned object, an imaging lens according to a first aspect of the present invention is an imaging lens comprising, in order from an object side to an image surface side: a first lens having a positive power whose convex surface faces the image surface side, a diaphragm, a second lens having a negative power whose convex surface faces the image surface side, a third lens having a positive power, and a fourth lens having a negative power, wherein conditions expressed by following expressions (1) and (2) are to be satisfied:

$$0.3 \leq f/f_1 \leq 1.7 \tag{1}$$

$$-2.7 \leq f/f_2 \leq -0.25 \tag{2}$$

where, f: focal distance of the entire lens system $f_1$: focal distance of the first lens $f_2$: focal distance of the second lens In the first aspect of the invention, a simple four-lens structure is used. The first lens is a lens having a positive power whose convex surface faces the image surface side. The second lens is a lens having a negative power whose convex surface faces the image surface side. The third lens is a lens having a positive power. The fourth lens is a lens having a negative power. The diaphragm is disposed between the first lens and the second lens. In addition, the conditions expressed by expressions (1) and (2) are satisfied. As a result, while being compact and light, the imaging lens can suppress reduction of peripheral vignetting and suppress reduction of peripheral light amount. Even with a large diameter, the imaging lens can successfully correct various aberrations, and an incident angle of a light beam incident on an image-taking surface can be relaxed (decreased).

An imaging lens according to a second aspect is the imaging lens according to the first aspect, wherein, further, a condition expressed by a following expression (3) is to be satisfied:

$$-7.0 \leq (r_{21}+r_{22})/(r_{21}-r_{22}) \leq -1.2 \tag{3}$$

where, $r_{21}$: center radius curvature of the object side face of the second lens $r_{22}$: center radius curvature of the image surface side face of the second lens In the second aspect of the present invention, further, the expression (3) is satisfied. Therefore, better balanced corrections of field curvature, axial chromatic aberration, and distortion can be made.

An imaging lens according to a third aspect is the imaging lens according to the first aspect, wherein, further, a condition expressed by a following expression (4) is to be satisfied:

$$0.8 \leq f/f_3 \leq 3.0 \quad (4)$$

where, $f_3$: focal distance of the third lens

In the third aspect of the invention, further, the expression (4) is satisfied. Therefore, both relaxing of the incident angle of the light beam incident on the image-taking surface and correction of distortion can be achieved with further certainty.

An imaging lens according to a fourth aspect is the imaging lens according to the first aspect, wherein the fourth lens is a meniscus lens whose concave surface faces the image surface side and, further, a condition expressed by a following expression (5) is to be satisfied:

$$-10.0 \leq (r_{41}+r_{42})/(r_{41}-r_{42}) \leq -2.5 \quad (5)$$

where, $r_{41}$: center radius curvature of the object side face of the fourth lens $r_{42}$: center radius curvature of the image surface side face of the fourth lens In the fourth aspect of the present invention, further, the expression (5) is satisfied. Therefore, both correction of the distortion and suppression of the peripheral chromatic flare can be achieved.

An imaging lens according to a fifth aspect is the imaging lens according to any one of aspects 1 to 4, wherein, the object side surface of the first lens is formed in an aspheric shape that is concave towards the object side, towards a peripheral side.

In the fifth aspect of the invention, reduction of peripheral light amount can be suppressed with further certainty.

EFFECT OF THE INVENTION

In the imaging lens of the invention, a large-diameter imaging lens that can suppress reduction of peripheral light amount, achieve size and weight reduction, and maintain excellent optical performance can be actualized.

DETAILED DESCRIPTION OF THE PREFERRED EMBODIMENT

An embodiment of the imaging lens according to the present invention will be described hereinafter with reference to FIG. 1.

Figure 1:
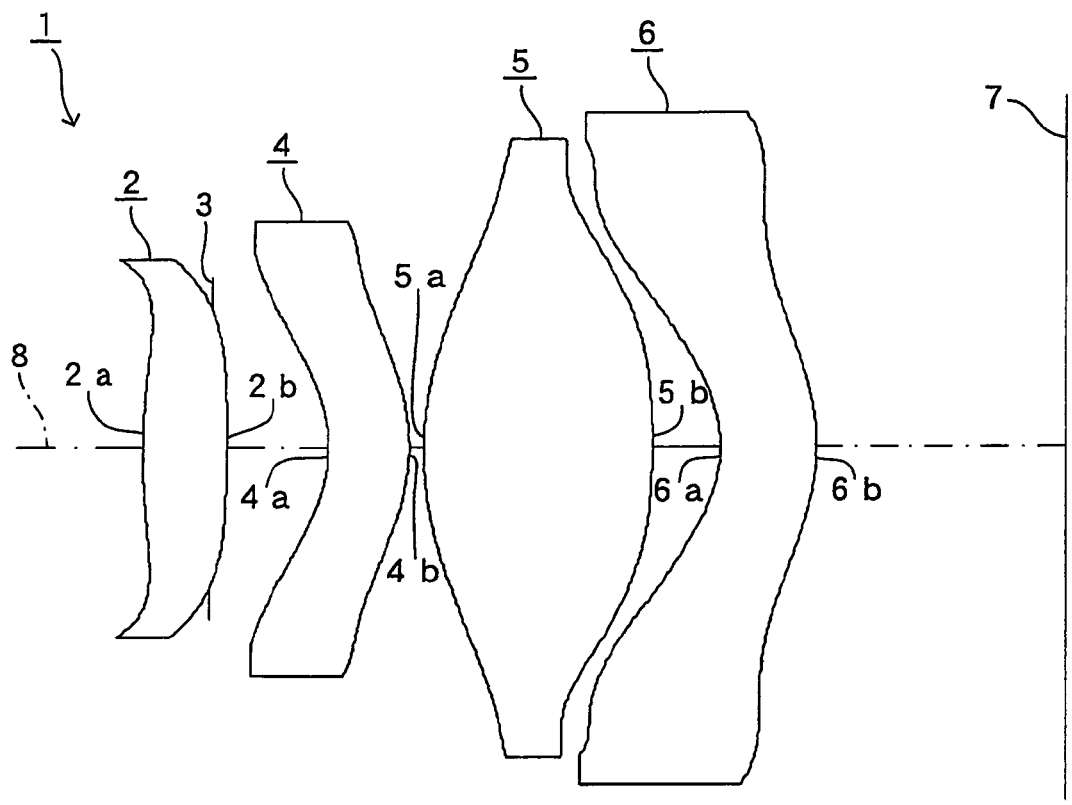
FIG. 1 is a schematic diagram for showing an embodiment of an imaging lens and an imaging device according to the present invention.

As shown in FIG. 1, an imaging lens 1 according to the embodiment comprises, in order from the object side toward the image surface side, a first lens 2 having a positive power whose convex surface faces the image surface side, a diaphragm 3, a second lens 4 having a negative power whose convex surface faces the image surface side, a third lens 5 having a positive power, and a fourth lens 6 having a negative power.

Each lens 2, lens 4, lens 5, and lens 6 are formed from resin material, such as cyclo-olefin copolymers, cycle-olefin polymers, and polycarbonate, using an injection-molding method. Alternatively, the lenses are formed using silicon resin.

Hereafter, respective lens surfaces of the lens 2, the lens 4, the lens 5, and the lens 6 on the object side are referred to as a first face $2a$, a first face $4a$, a first face $5a$, and a first face $6a$, as required. Respective lens surfaces of the lens 2, the lens 4, the lens 5, and the lens 6 on the image surface side are referred to as a second face $2b$, a second face $4b$, a second face $5b$, and a second face $6b$, as required.

An image-taking surface 7 that is a light-receiving surface of an image sensor element, such as a CCD or a CMOS, is disposed on the second face $6b$ of the fourth lens 6.

Various filters, such as a cover glass, an infrared (IR) cut filter, and a lowpass filter, can be disposed as required between the second face $6b$ of the fourth lens 6 and the imaging-taking surface 7.

When the number of lenses is five or more, the overall length of the lens system becomes too long, making the lens system unsuitable for achieving size and weight reduction.

As described above, when the diaphragm 3 is disposed closest to the object side or, in other words, on the object side of the first lens 2, asymmetry of the lens system increases. Therefore, correction of various aberrations becomes difficult. In particular, in the imaging lens 1 aiming for a large diameter as according to the embodiment, the correction of various aberrations becomes more difficult.

As described above, when the first lens 2 is a lens having a strong convex surface facing the object side, peripheral vignetting decreases. Reduction of the peripheral light amount becomes difficult to suppress.

As described above, when the second lens 4 is a biconcave lens, the incident angle of the light beam incident on the image-taking surface 7 becomes too large. Various aberrations, such as astigmatism, frequently occur. Therefore, from the perspective of optical performance, this is particularly disadvantageous for the imaging lens 1 aiming for a large diameter as according to the embodiment.

When the third lens 5 is a lens having a negative power, the incident angle of the peripheral light beam incident on the image-taking surface 7 becomes too large. Optical performance becomes difficult to maintain.

When the fourth lens 6 is a lens having a positive power, axial chromatic aberration increases.

Therefore, according to the embodiment, a four-lens structure lens system is used. The first lens 2 is a lens having a positive power whose convex surface faces the image surface side. The second lens 4 is a lens having a negative power whose convex surface faces the image surface side. The third lens 5 is a lens having a positive power. The fourth lens 6 is a lens having a negative power. The diaphragm 3 is disposed between the first lens 2 and the second lens 4. As a result, even with a large diameter, the lens system can be compact and light, reduction of peripheral light amount can be suppressed, various aberrations can be successfully corrected, and the incident angle of the light beam incident on the image-taking surface 7 can be relaxed.

When the first face $2a$ of the first lens 2 is formed into an aspheric shape that is concave towards the object side, from a center side towards a peripheral side, reduction of peripheral vignetting can be more effectively suppressed. The peripheral light amount can be more stably ensured.

In addition to the above-described configuration, further, according to the embodiment, conditions expressed by following expressions (1) and (2) are satisfied:

$$0.3 \leq f/f_1 \leq 1.7 \tag{1}$$

$$-2.7 \leq f/f_2 \leq -0.25 \tag{2}$$

where, f in the expressions (1) and (2) is the focal distance of the entire lens system. $f_1$ in the expression (1) is the focal distance of the first lens 2. $f_2$ in the expression (2) is the focal distance of the second lens 4.

When the value of $f/f_1$ is less than the value (0.3) in the expression (1), the negative power of the second lens 4 and the fourth lens 6 is difficult to increase. Therefore, the axial chromatic aberration is not sufficiently corrected. A load is placed on the third lens 5 having a large diameter. Flare element of a marginal light beam increases.

At the same time, when the value of $f/f_1$ is greater than (1.7) in the expression (1), the overall axial chromatic aberration becomes more easily over-corrected. The power of the third lens 5 becomes difficult to use proactively. Various aberrations in addition to the axial chromatic aberration become difficult to correct.

Therefore, according to the embodiment, by the value of $f/f_1$ being set to satisfy the expression (1), various aberrations including the axial chromatic aberration can be corrected with further certainty and occurrence of flare can be effectively controlled.

The relationship between f and $f_1$ is more preferably $0.4 \leq f/f_1 \leq 1.4$.

When the value of $f/f_2$ is less than the value (−2.7) in the expression (2), the Petzval sum decreases. Although this is preferable in terms of astigmatism and field curvature correction, the axial chromatic aberration becomes over-corrected and balance in correction cannot be maintained among the various aberrations.

At the same time, when the value of $f/f_2$ is greater than (−0.25) in the expression (2), the Petzval sum deteriorates. The astigmatism and field curvature become difficult to correct.

Therefore, according to the embodiment, by the value of $f/f_2$ being set to satisfy the expression (2), better balanced corrections of astigmatism, field curvature, and axial chromatic aberration can be made.

The relationship between f and $f_2$ is more preferably $-2.5 \leq f/f_2 \leq 1-0.3$.

In addition to the above-described configuration, according to the embodiment, a condition expressed by a following expression (3) is satisfied:

$$-7.0 \leq (r_{21}+r_{22})/(r_{21}-r_{22}) \leq -1.2 \quad (3)$$

where, $r_{21}$ in the expression (3) is the center radius curvature of the first face 4a of the second lens 4. $r_{22}$ in the expression (3) is the center radius curvature of the second face 4b of the second lens 4.

When the value of $(r_{21}+r_{22})/(r_{21}-r_{22})$ is less than the value (−7.0) in the expression (3), though this is preferable in terms of astigmatism and field curvature correction, the axial chromatic aberration becomes insufficiently corrected and balanced corrections of the field curvature and the axial chromatic aberration become difficult to make.

At the same time, when the value of $(r_{21}+r_{22})/(r_{21}-r_{22})$ is greater than (−1.2) in the expression (3), field curvature and distortion become difficult to correct.

Therefore, according to the embodiment, by the value of $(r_{21}+r_{22})/(r_{21}-r_{22})$ being set to satisfy the expression (3), better balanced corrections of field curvature, axial chromatic aberration, and distortion can be made.

The relationship between $(r_{21}+r_{22})$ and $(r_{21}-r_{22})$ is more preferably $-6.0 \leq (r_{21}+r_{22})/(r_{21}-r_{22}) \leq -1.5$.

In addition to the above-described configuration, according to the embodiment, a condition expressed by a following expression (4) is satisfied:

$$0.8 \leq f/f_3 \leq 3.0 \quad (4)$$

where, $f_3$ in the expression (4) is the focal distance of the third lens 5.

When the value of $f/f_3$ is less than the value (0.8) in the expression (4), the incident angle of the light beam incident on the image-taking surface 7 becomes too large.

At the same time, when the value of $f/f_3$ is greater than (3.0) in the expression (4), negative distortion becomes too large.

Therefore, according to the embodiment, by the value of $f/f_3$ being set to satisfy the expression (4), both relaxing of the incident angle of the light beam incident on the image-taking surface 7 and correction of the distortion can be achieved with further certainty.

The relationship between f and $f_3$ is more preferably $1.3 \leq f/f_3 \leq 2.3$.

In addition to the above-described configuration, according to the embodiment, a condition expressed by a following expression (5) is satisfied:

$$-100.0 \leq (r_{41}+r_{42})/(r_{41}-r_{42}) \leq -2.5 \quad (5)$$

where, $r_{41}$ in the expression (5) is the center radius curvature of the first face 6a of the fourth lens 6. $r_{42}$ in the expression (5) is the center radius curvature of the second face 6b of the fourth lens 6.

When the value of $(r_{41}+r_{42})/(r_{41}-r_{42})$ is less than the value (−10.0) in the expression (5), the negative distortion becomes too large.

At the same time, when the value of $(r_{41}+r_{42})/(r_{41}-r_{42})$ is greater than (−2.5) in the expression (5), peripheral chromatic flare increases and the distortion becomes difficult to correct.

Therefore, according to the embodiment, by the value of $(r_{41}+r_{42})/(r_{41}-r_{42})$ being set to satisfy the expression (5), both correction of the distortion and suppression of the peripheral chromatic flare can be achieved.

The relationship between $(r_{41}+r_{42})$ and $(r_{41}-r_{42})$ is more preferably $-7.0 \leq (r_{41}+r_{42})/(r_{41}-r_{42}) \leq -4.0$.

EXAMPLES

Next, EXAMPLES of the present invention will be described with reference to FIG. 2 to FIG. 29.

In the EXAMPLES, F no denotes F number, ω denotes half of the angle-of-view, and r denotes the radius curvature of an optical surface (center radius curvature of an aspherical surface). Further, d denotes a distance to the next optical surface on an optical axis 8, nd denotes the index of refraction of each optical system when the d line (yellow) is irradiated, and vd denotes the Abbe number of each optical system also when the d line is irradiated.

k, A, B, C, and D denote each coefficient in a following expression (6). Specifically, the shape of the aspherical surface of the lens is expressed by the following expression provided that the direction of the optical axis 8 is taken as the Z axis, the direction orthogonal to the optical axis 8 as the X axis, the traveling direction of light is positive, k is the constant of cone, A, B, C, and D are the aspherical coefficients, and r is the center radius curvature.

$$Z(X) = r^{-1}X^2/[1+\{1-(k+1)r^{-2}X^2\}^{1/2}]+AX^4+BX^6+CX^8+DX^{10} \quad (6)$$

In the following EXAMPLES, reference code E used for a numerical value denoting the constant of cone and the aspherical coefficient indicates that the numerical value following E is an exponent having 10 as the base and that the numerical value before E indicates is multiplied by the numerical value denoted by the exponent having 10 as the base. For example, −0.5392E−02 denotes $-0.5392 \times 10^{-2}$.

First Example

Figure 2:
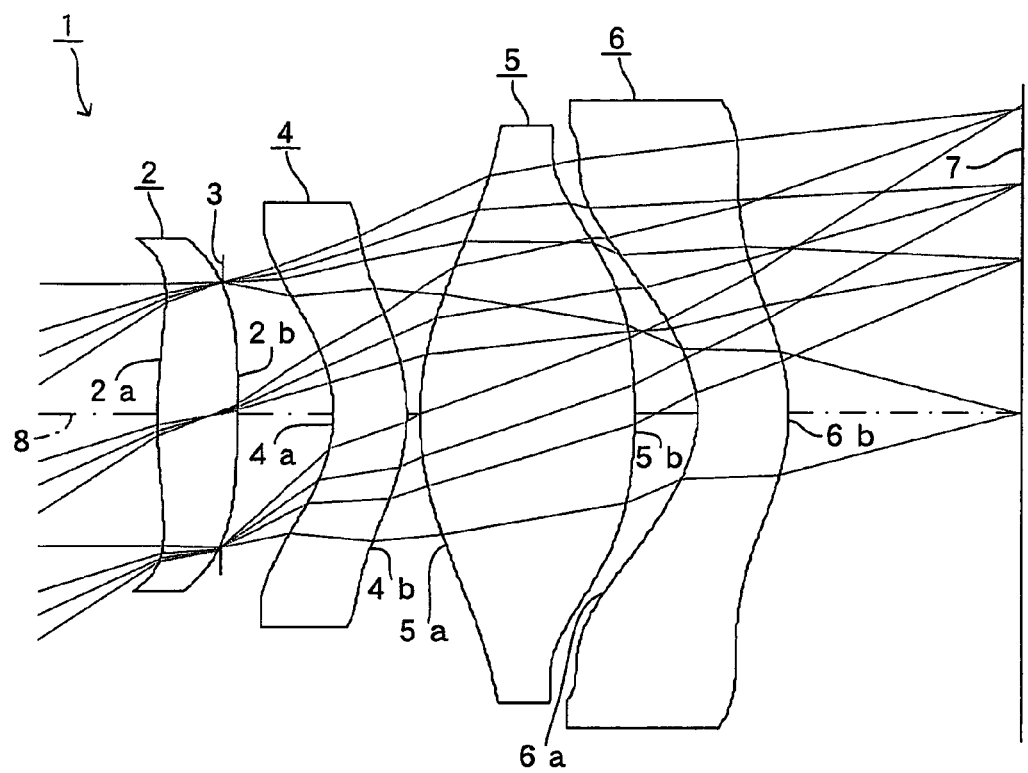
FIG. 2 is a schematic diagram for showing a FIRST EXAMPLE of the imaging lens and the imaging device according to the present invention.

FIG. 2 shows a FIRST EXAMPLE of the present invention. In the FIRST EXAMPLE, a center section of the second face 2b of the first lens 2 passes through the diaphragm 3 and is positioned (projects) closer to the image surface side than the diaphragm 3. However, the overall first lens 2 is disposed closer to the object side than the diaphragm 3.

The imaging lens 1 of the FIRST EXAMPLE was set under the following conditions:

| Lens Data f = 8.00 mm, F no = 2.0, ω = 32.1° | | | | |
|---|---|---|---|---|
| Face Number | r | d | nd | vd |
| (Object Point) | | INFINITY | | |
| 1 (First Face of First Lens) | 8.212 | 1.22 | 1.530 | 55.8 |
| 2 (Second Face of First Lens) | −35.739 | −0.23 | | |
| 3 (Diaphragm) | INFINITY | 1.71 | | |
| 4 (First Face of Second Lens) | −2.088 | 1.15 | 1.585 | 30.0 |
| 5 (Second Face of Second Lens) | −2.923 | 0.20 | | |

-continued

Lens Data
f = 8.00 mm, F no = 2.0, ω = 32.1°

| | r | d | nd | νd |
|---|---|---|---|---|
| 6 (First Face of Third Lens) | 4.720 | 3.26 | 1.530 | 55.8 |
| 7 (Second Face of Third Lens) | −9.116 | 0.97 | | |
| 8 (First Face of Fourth Lens) | −1.938 | 1.40 | 1.585 | 30.0 |
| 9 (Second Face of Fourth Lens) | −2.876 | | | |

| Face Number | k | A | B | C | D |
|---|---|---|---|---|---|
| 1 | 0.000 | −0.5392E−02 | −0.8082E−03 | 0.4779E−04 | −0.1722E−04 |
| 2 | 162.753 | −0.9671E−02 | −0.4901E−03 | 0.3801E−04 | −0.2161E−05 |
| 4 | −0.743 | 0.1327E−01 | 0.5349E−03 | 0.5219E−04 | −0.7531E−05 |
| 5 | −2.207 | 0.4517E−03 | 0.8852E−03 | 0.4857E−05 | −0.5182E−05 |
| 6 | −4.237 | 0.1429E−02 | −0.1541E−03 | 0.2880E−06 | 0.1174E−06 |
| 7 | 0.004 | −0.6554E−02 | −0.2124E−03 | 0.6210E−04 | −0.1799E−05 |
| 8 | −0.924 | 0.1305E−01 | −0.7455E−03 | 0.6933E−04 | −0.2063E−05 |
| 9 | −0.903 | 0.1224E−01 | −0.1402E−03 | −0.9784E−05 | 0.1899E−06 |

Under such conditions, $f/f_1=0.63$ was achieved, thereby satisfying the expression (1). $f/f_2=-0.31$ was achieved, thereby satisfying the expression (2). $(r_{21}+r_{22})/(r_{21}-r_{22})=-6.01$ was achieved, thereby satisfying the expression (3). $f/f_3=1.26$ was achieved, thereby satisfying the expression (4). $(r_{41}+r_{42})/(r_{41}-r_{42})=-5.13$ was achieved, thereby satisfying the expression (5).

Figure 3:
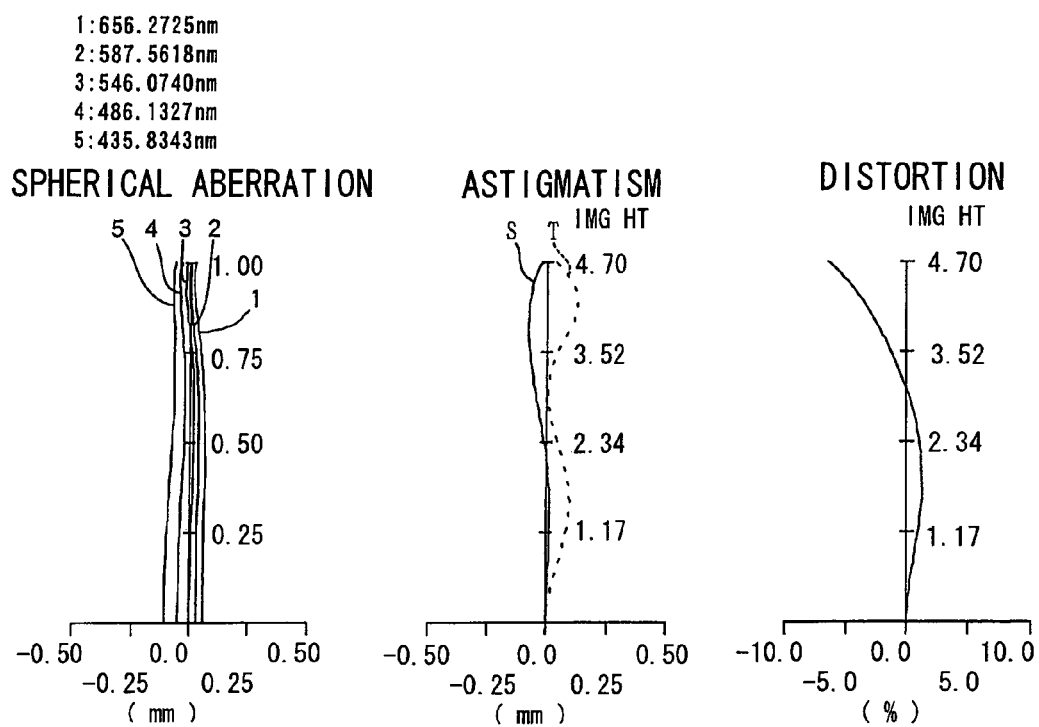
FIG. 3 shows graphs for describing the spherical aberration, astigmatism, and distortion of the imaging lens shown in FIG. 2.

FIG. 3 shows the spherical aberration, astigmatism, and distortion in the imaging lens 1 of the FIRST EXAMPLE.

According to the result, each of the spherical aberration, astigmatism, and distortion are almost satisfactory. It can be seen from the result that sufficient optical property can be obtained.

Second Example

Figure 4:
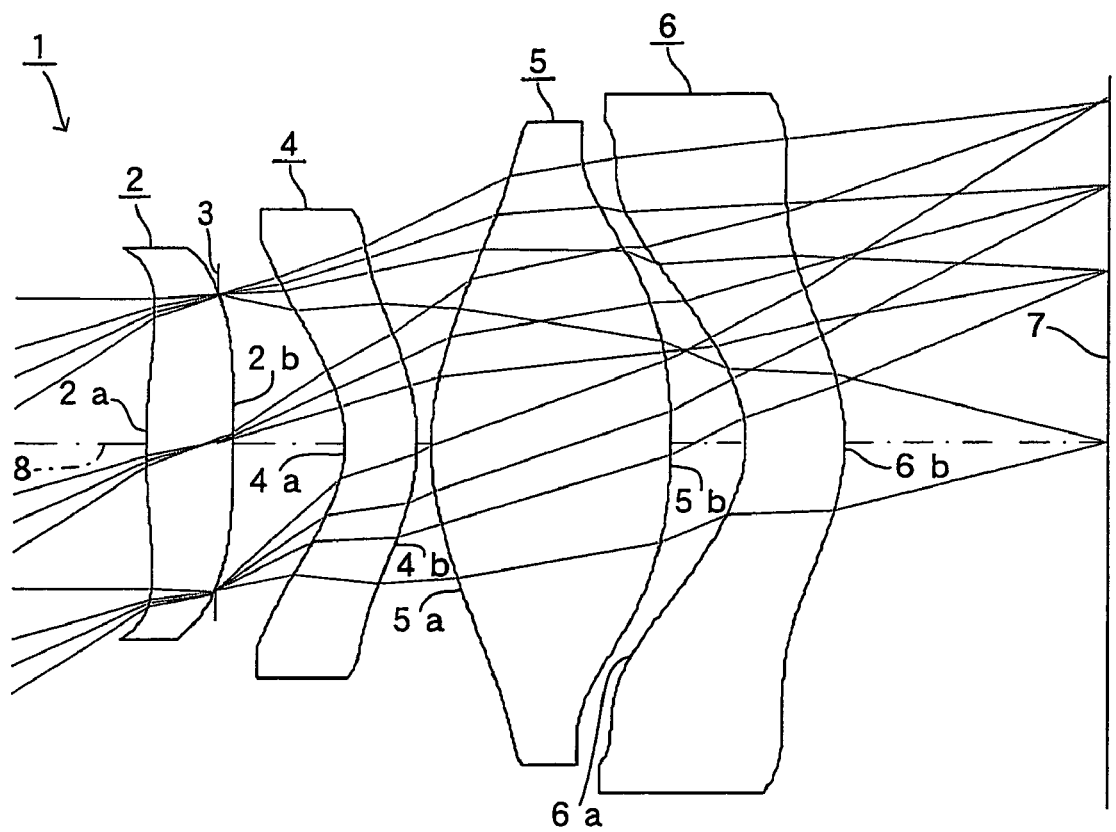
FIG. 4 is a schematic diagram for showing a SECOND EXAMPLE of the imaging lens and the imaging device according to the present invention.

FIG. 4 shows a SECOND EXAMPLE of the present invention. In this example as well, the center section of the second face 2b of the first lens 2 passes through the diaphragm 3 and is positioned closer to the image surface side than the diaphragm 3.

The imaging lens 1 of the SECOND EXAMPLE was set under the following conditions:

Lens Data
f = 8.00 mm, F no = 2.0, ω = 32.0°

| Face Number | r | d | nd | νd |
|---|---|---|---|---|
| (Object Point) | INFINITY | | | |
| 1 (First Face of First Lens) | 8.399 | 1.21 | 1.530 | 55.8 |
| 2 (Second Face of First Lens) | −36.556 | −0.23 | | |
| 3 (Diaphragm) | INFINITY | 1.76 | | |
| 4 (First Face of Second Lens) | −1.916 | 0.99 | 1.585 | 30.0 |
| 5 (Second Face of Second Lens) | −2.879 | 0.20 | | |
| 6 (First Face of Third Lens) | 4.118 | 3.30 | 1.530 | 55.8 |
| 7 (Second Face of Third Lens) | −8.144 | 1.03 | | |
| 8 (First Face of Fourth Lens) | −1.868 | 1.36 | 1.585 | 30.0 |
| 9 (Second Face of Fourth Lens) | −2.766 | | | |

| Face Number | k | A | B | C | D |
|---|---|---|---|---|---|
| 1 | 0.000 | −0.5241E−02 | −0.8390E−03 | 0.5104E−04 | −0.1649E−04 |
| 2 | 212.247 | −0.9290E−02 | −0.4764E−03 | 0.2241E−04 | 0.1404E−05 |
| 4 | −0.971 | 0.1907E−01 | −0.1796E−02 | 0.3766E−03 | −0.2838E−04 |
| 5 | −2.072 | 0.3015E−02 | 0.4623E−03 | 0.4944E−04 | −0.7532E−05 |
| 6 | −5.196 | 0.1654E−02 | −0.1391E−03 | −0.2804E−05 | 0.2413E−06 |
| 7 | −4.986 | −0.6139E−02 | −0.2585E−03 | 0.5972E−04 | −0.1668E−05 |
| 8 | −0.955 | 0.1399E−01 | −0.7826E−03 | 0.6684E−04 | −0.1981E−05 |
| 9 | −0.904 | 0.1232E−01 | −0.9744E−04 | −0.1143E−04 | 0.2000E−06 |

Under such conditions, $f/f_1=0.62$ was achieved, thereby satisfying the expression (1). $f/f_2=-0.51$ was achieved, thereby satisfying the expression (2). $(r_{21}+r_{22})/(r_{21}-r_{22})=-4.98$ was achieved, thereby satisfying the expression (3). $f/f_3=1.41$ was achieved, thereby satisfying the expression (4). $(r_{41}+r_{42})/(r_{41}-r_{42})=-5.16$ was achieved, thereby satisfying the expression (5).

Figure 5:
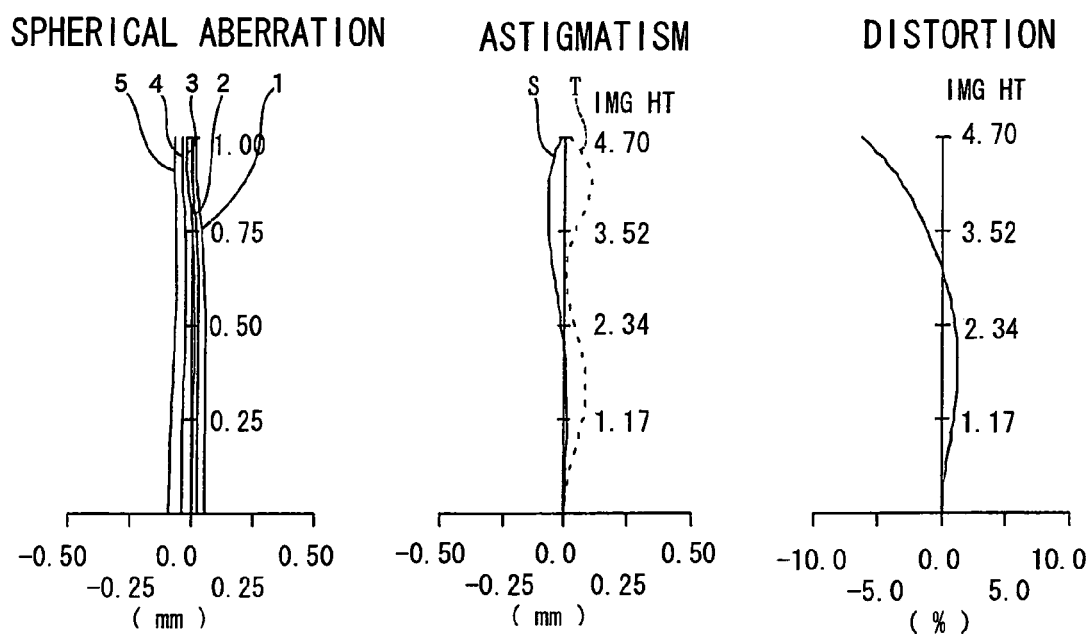
FIG. 5 shows graphs for describing the spherical aberration, astigmatism, and distortion of the imaging lens shown in FIG. 4.

FIG. 5 shows the spherical aberration, astigmatism, and distortion in the imaging lens 1 of the SECOND EXAMPLE.

According to the result, each of the spherical aberration, astigmatism, and distortion are almost satisfactory. It can be seen from the result that sufficient optical property can be obtained.

Third Example

Figure 6:
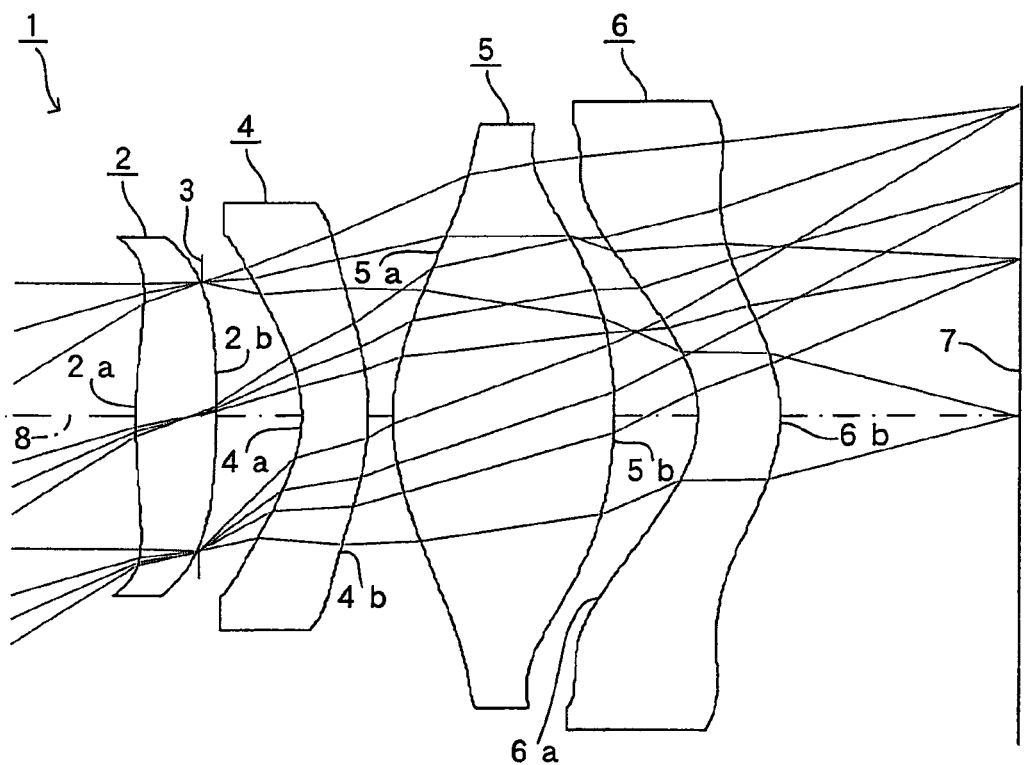
FIG. 6 is a schematic diagram for showing a THIRD EXAMPLE of the imaging lens and the imaging device according to the present invention.

FIG. 6 shows a THIRD EXAMPLE of the present invention. In this example as well, the center section of the second face 2b of the first lens 2 passes through the diaphragm 3 and is positioned closer to the image surface side than the diaphragm 3.

The imaging lens 1 of the THIRD EXAMPLE was set under the following conditions:

| Lens Data $f = 8.00$ mm, F no = 2.0, $\omega = 31.9°$ | | | | |
|---|---|---|---|---|
| Face Number | r | d | nd | νd |
| (Object Point) | | INFINITY | | |
| 1 (First Face of First Lens) | 9.049 | 1.22 | 1.530 | 55.8 |
| 2 (Second Face of First Lens) | −20.050 | −0.24 | | |
| 3 (Diaphragm) | INFINITY | 1.55 | | |
| 4 (First Face of Second Lens) | −2.010 | 0.98 | 1.585 | 30.0 |
| 5 (Second Face of Second Lens) | −3.940 | 0.37 | | |
| 6 (First Face of Third Lens) | 3.462 | 3.30 | 1.530 | 55.8 |
| 7 (Second Face of Third Lens) | −6.579 | 1.29 | | |
| 8 (First Face of Fourth Lens) | −1.666 | 1.26 | 1.585 | 30.0 |
| 9 (Second Face of Fourth Lens) | −2.443 | | | |

| Face Number | k | A | B | C | D |
|---|---|---|---|---|---|
| 1 | 0.000 | −0.4083E−02 | −0.9486E−03 | 0.9486E−04 | −0.1982E−04 |
| 2 | 52.520 | −0.6541E−02 | −0.6158E−03 | 0.4152E−04 | −0.1589E−05 |
| 4 | −1.222 | 0.2430E−01 | −0.5210E−02 | 0.8403E−03 | −0.5586E−04 |
| 5 | −2.527 | 0.5922E−02 | −0.5405E−03 | 0.1028E−03 | −0.7973E−05 |
| 6 | −5.362 | 0.1800E−02 | −0.1761E−03 | −0.9952E−06 | 0.1939E−06 |
| 7 | −8.596 | −0.4696E−02 | −0.2392E−03 | 0.4555E−04 | −0.1170E−05 |
| 8 | −1.075 | 0.1591E−01 | −0.8831E−03 | 0.5724E−04 | −0.1587E−05 |
| 9 | −0.939 | 0.1312E−01 | 0.9260E−05 | −0.1875E−04 | 0.3228E−06 |

Under such conditions, $f/f_1=0.67$ was achieved, thereby satisfying the expression (1). $f/f_2=-0.93$ was achieved, thereby satisfying the expression (2). $(r_{21}+r_{22})/(r_{21}-r_{22})=-3.08$ was achieved, thereby satisfying the expression (3). $f/f_3=1.66$ was achieved, thereby satisfying the expression (4). $(r_{41}+r_{42})/(r_{41}-$ was achieved, thereby satisfying the expression (5).

Figure 7:
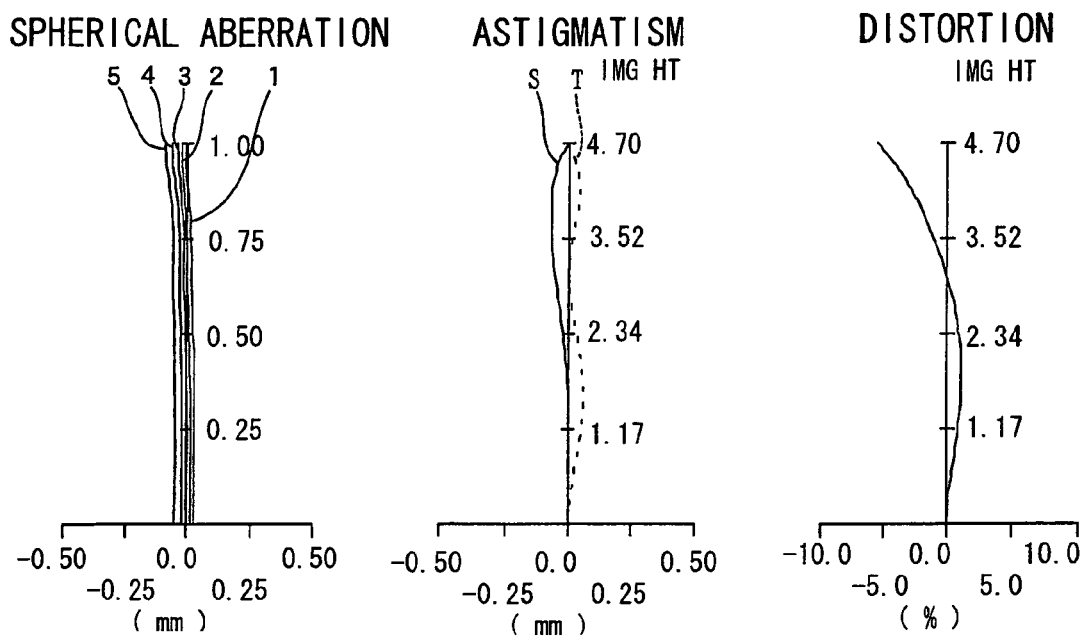
FIG. 7 shows graphs for describing the spherical aberration, astigmatism, and distortion of the imaging lens shown in FIG. 6.

FIG. 7 shows the spherical aberration, astigmatism, and distortion in the imaging lens 1 of the THIRD EXAMPLE.

According to the result, each of the spherical aberration, astigmatism, and distortion are almost satisfactory. It can be seen from the result that sufficient optical property can be obtained.

Fourth Example

Figure 8:
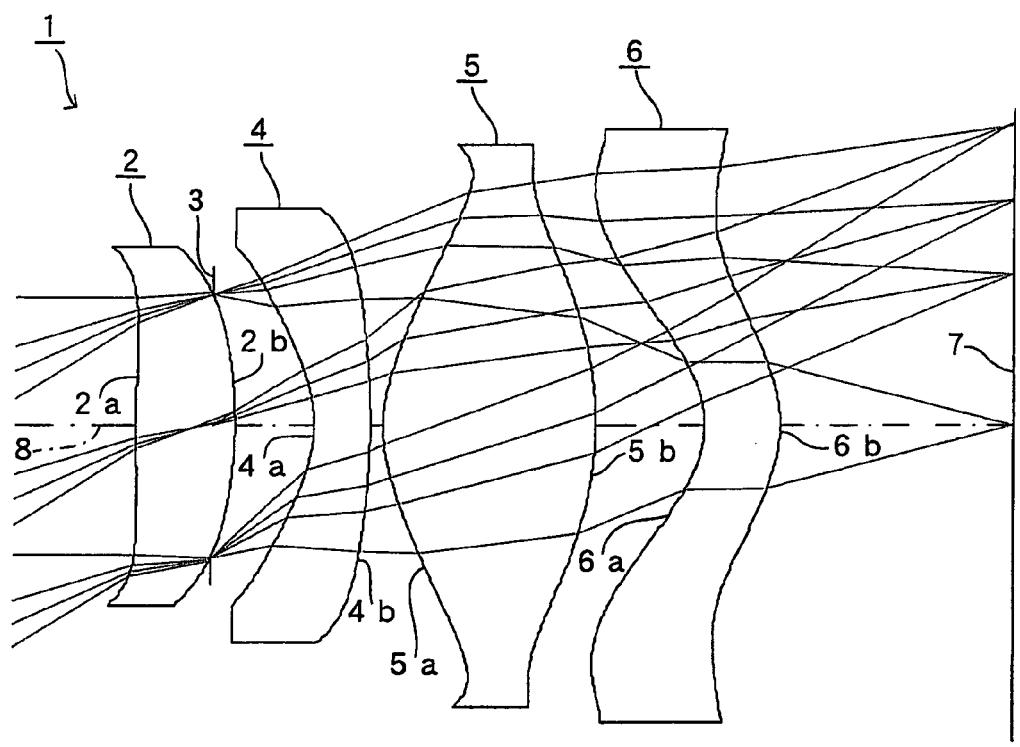
FIG. 8 is a schematic diagram for showing a FOURTH EXAMPLE of the imaging lens and the imaging device according to the present invention.

FIG. 8 shows a FOURTH EXAMPLE of the present invention. In this example as well, the center section of the second face 2b of the first lens 2 passes through the diaphragm 3 and is positioned closer to the image surface side than the diaphragm 3.

The imaging lens 1 of the FOURTH EXAMPLE was set under the following conditions:

Lens Data
f = 8.00 mm, F no = 2.0, ω = 31.6°

| Face Number | r | d | nd | νd |
|---|---|---|---|---|
| (Object Point) | | INFINITY | | |
| 1 (First Face of First Lens) | 23.875 | 1.57 | 1.530 | 55.8 |
| 2 (Second Face of First Lens) | −7.081 | −0.36 | | |
| 3 (Diaphragm) | INFINITY | 1.60 | | |
| 4 (First Face of Second Lens) | −1.838 | 0.90 | 1.585 | 30.0 |
| 5 (Second Face of Second Lens) | −9.499 | 0.20 | | |
| 6 (First Face of Third Lens) | 2.350 | 3.30 | 1.530 | 55.8 |
| 7 (Second Face of Third Lens) | −5.350 | 1.70 | | |
| 8 (First Face of Fourth Lens) | −1.580 | 1.19 | 1.585 | 30.0 |
| 9 (Second Face of Fourth Lens) | −2.276 | | | |

| Face Number | k | A | B | C | D |
|---|---|---|---|---|---|
| 1 | 0.000 | −0.3961E−02 | −0.5673E−03 | 0.5519E−04 | −0.9395E−05 |
| 2 | 1.254 | −0.2079E−02 | −0.7149E−03 | 0.8317E−04 | −0.6131E−05 |
| 4 | −4.886 | −0.4347E−02 | 0.7277E−03 | −0.1198E−03 | 0.4956E−05 |
| 5 | 6.605 | 0.4333E−02 | −0.1294E−03 | −0.3211E−04 | 0.1773E−05 |
| 6 | −6.278 | 0.3411E−02 | −0.4288E−03 | 0.2842E−04 | −0.9499E−06 |
| 7 | −1.830 | 0.7325E−03 | −0.3083E−03 | 0.3755E−04 | −0.1003E−05 |
| 8 | −1.071 | 0.1936E−01 | −0.8815E−03 | 0.3362E−04 | −0.6411E−06 |
| 9 | −0.940 | 0.1348E−01 | 0.9837E−04 | −0.2713E−04 | 0.6021E−06 |

Under such conditions, $f/f_1=0.77$ was achieved, thereby satisfying the expression (1). $f/f_2=-1.98$ was achieved, thereby satisfying the expression (2). $(r_{21}+r_{22})/(r_{21}-r_{22})=-1.48$ was achieved, thereby satisfying the expression (3). $f/f_3=2.22$ was achieved, thereby satisfying the expression (4). $(r_{41}+r_{42})/(r_{41}-r_{42})=-5.54$ was achieved, thereby satisfying the expression (5).

Figure 9:
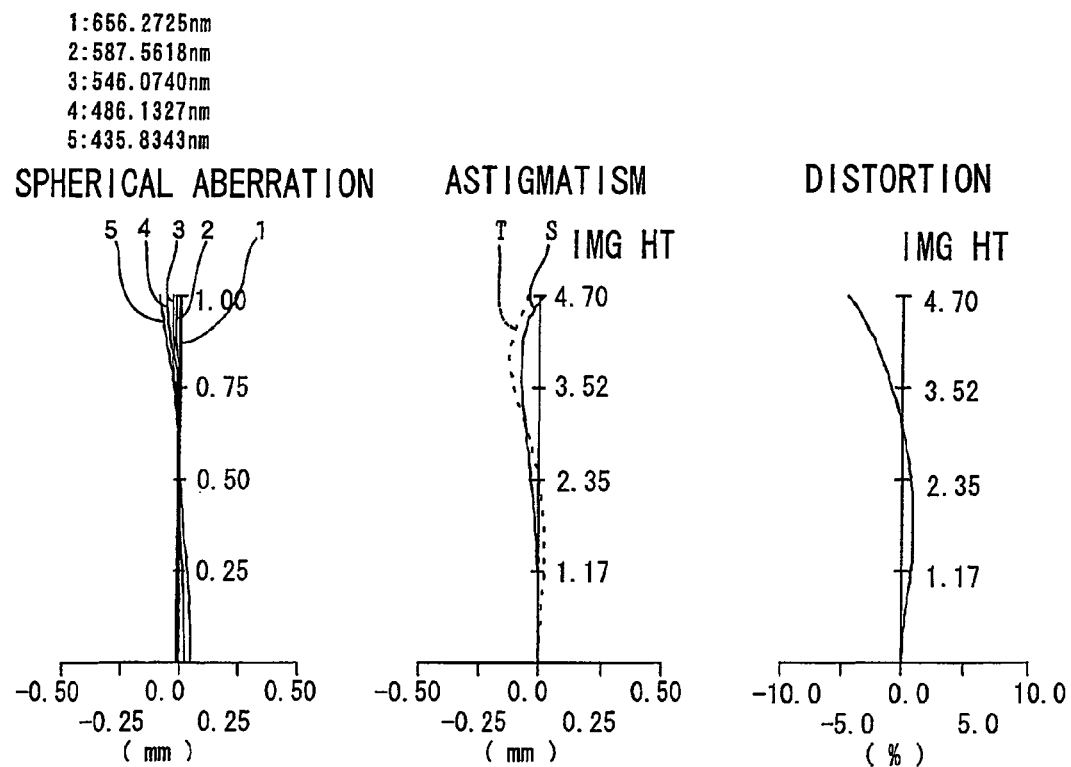
FIG. 9 shows graphs for describing the spherical aberration, astigmatism, and distortion of the imaging lens shown in FIG. 8.

FIG. 9 shows the spherical aberration, astigmatism, and distortion in the imaging lens 1 of the FOURTH EXAMPLE.

According to the result, each of the spherical aberration, astigmatism, and distortion are almost satisfactory. It can be seen from the result that sufficient optical property can be obtained.

Fifth Example

Figure 10:
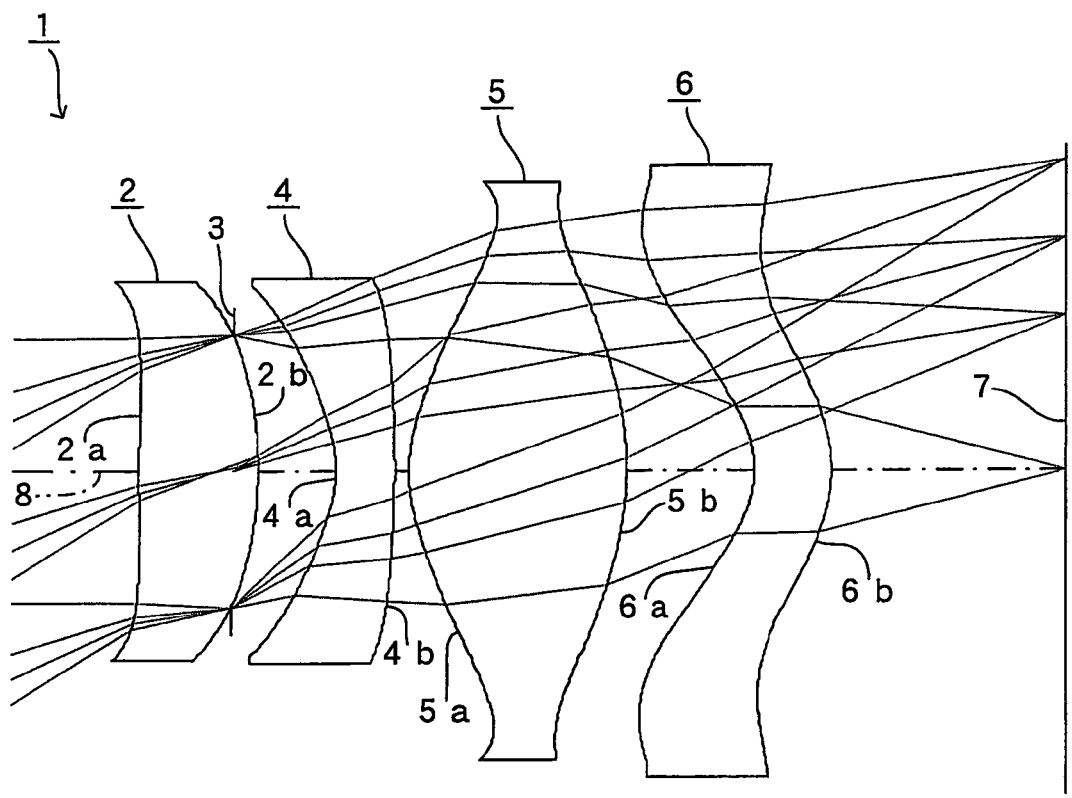
FIG. 10 is a schematic diagram for showing a FIFTH EXAMPLE of the imaging lens and the imaging device according to the present invention.

FIG. 10 shows a FIFTH EXAMPLE of the present invention. In this example as well, the center section of the second face 2b of the first lens 2 passes through the diaphragm 3 and is positioned closer to the image surface side than the diaphragm 3.

The imaging lens 1 of the FIFTH EXAMPLE was set under the following conditions:

Lens Data
f = 8.00 mm, F no = 2.0, ω = 31.5°

| Face Number | r | d | nd | νd |
|---|---|---|---|---|
| (Object Point) | | INFINITY | | |
| 1 (First Face of First Lens) | 37.706 | 1.83 | 1.530 | 55.8 |
| 2 (Second Face of First Lens) | −5.924 | −0.39 | | |
| 3 (Diaphragm) | INFINITY | 1.58 | | |
| 4 (First Face of Second Lens) | −1.854 | 0.90 | 1.585 | 30.0 |
| 5 (Second Face of Second Lens) | −16.244 | 0.20 | | |
| 6 (First Face of Third Lens) | 2.279 | 3.30 | 1.530 | 55.8 |
| 7 (Second Face of Third Lens) | −5.124 | 1.95 | | |
| 8 (First Face of Fourth Lens) | −1.573 | 1.16 | 1.585 | 30.0 |
| 9 (Second Face of Fourth Lens) | −2.220 | | | |

| Face Number | k | A | B | C | D |
|---|---|---|---|---|---|
| 1 | 0.000 | −0.3311E−02 | −0.4009E−03 | 0.3971E−04 | −0.6157E−05 |
| 2 | −1.324 | −0.4746E−03 | −0.8594E−03 | 0.9383E−04 | −0.6028E−05 |
| 4 | −5.227 | −0.2603E−02 | −0.2367E−04 | −0.2449E−04 | −0.1461E−05 |
| 5 | 22.690 | 0.3062E−02 | −0.3987E−03 | −0.3546E−05 | 0.5445E−06 |
| 6 | −6.220 | 0.2976E−02 | −0.3729E−03 | 0.2403E−04 | −0.8343E−06 |
| 7 | 1.534 | 0.1119E−02 | −0.2054E−03 | 0.2409E−04 | −0.5948E−06 |

-continued

Lens Data
f = 8.00 mm, F no = 2.0, ω = 31.5°

| | | | | |
|---|---|---|---|---|
| 8 | −1.064 | 0.1974E−01 | −0.8725E−03 | 0.3105E−04 | −0.5621E−06 |
| 9 | −0.951 | 0.1355E−01 | 0.4390E−04 | −0.2155E−04 | 0.4578E−06 |

Under such conditions, $f/f_1=0.82$ was achieved, thereby satisfying the expression (1). $f/f_2=-2.20$ was achieved, thereby satisfying the expression (2). $(r_{21}+r_{22})/(r_{21}-r_{22})=-1.26$ was achieved, thereby satisfying the expression (3). $f/f_3=2.28$ was achieved, thereby satisfying the expression (4). $(r_{41}+r_{42})/(r_{41}-r_{42})=-5.87$ was achieved, thereby satisfying the expression (5).

Figure 11:
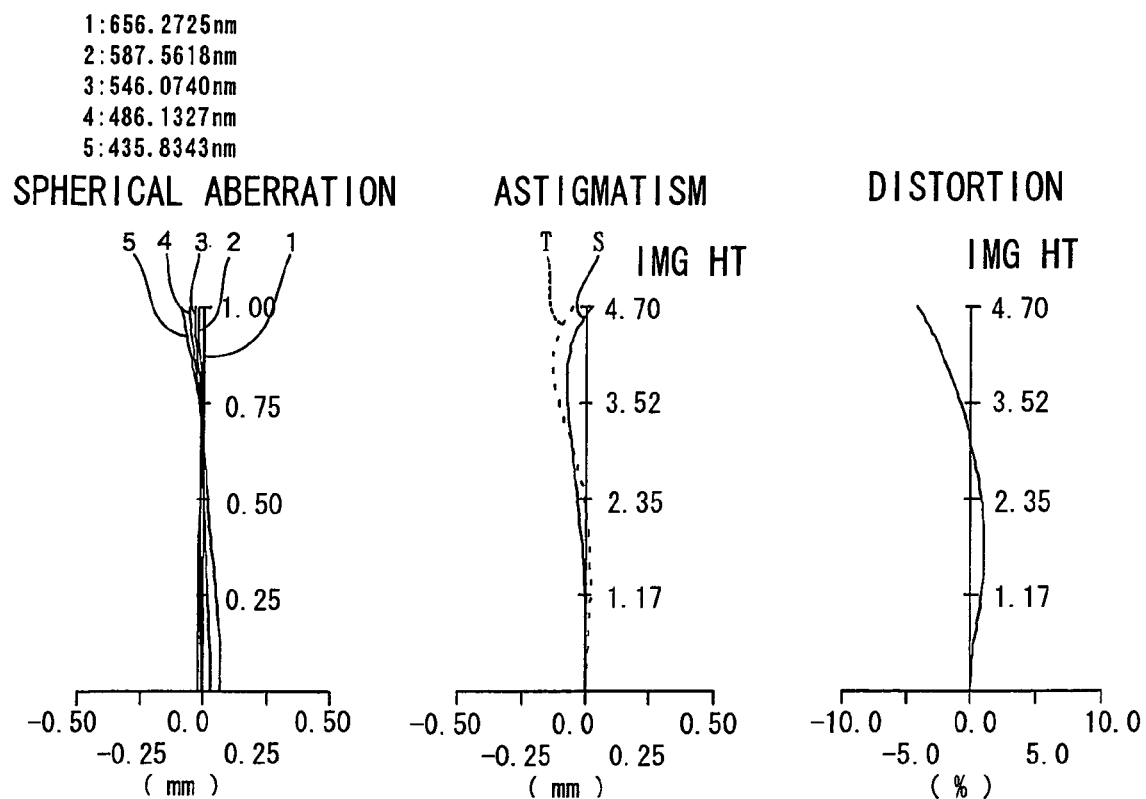
FIG. 11 shows graphs for describing the spherical aberration, astigmatism, and distortion of the imaging lens shown in FIG. 10.

FIG. 11 shows the spherical aberration, astigmatism, and distortion in the imaging lens 1 of the FIFTH EXAMPLE.

According to the result, each of the spherical aberration, astigmatism, and distortion are almost satisfactory. It can be seen from the result that sufficient optical property can be obtained.

Sixth Example

Figure 12:
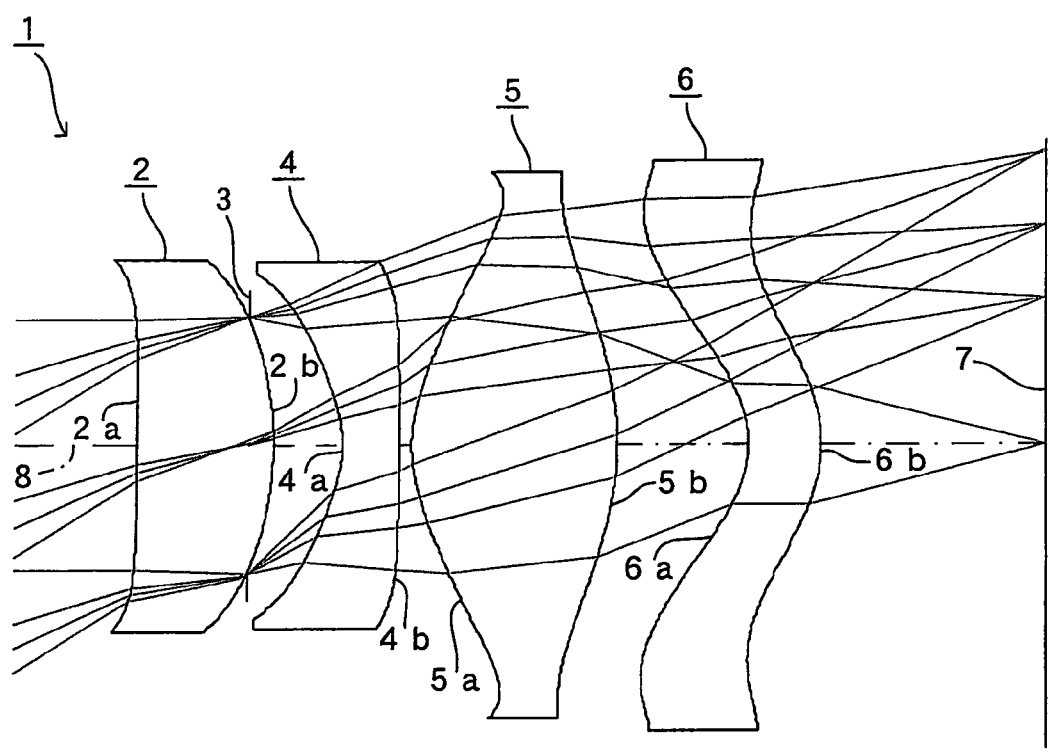
FIG. 12 is a schematic diagram for showing a SIXTH EXAMPLE of the imaging lens and the imaging device according to the present invention.

FIG. 12 shows a SIXTH EXAMPLE of the present invention. In this example as well, the center section of the second face 2b of the first lens 2 passes through the diaphragm 3 and is positioned closer to the image surface side than the diaphragm 3.

The imaging lens 1 of the SIXTH EXAMPLE was set under the following conditions:

Under such conditions, $f/f_1=0.92$ was achieved, thereby satisfying the expression (1). $f/f_2=-2.55$ was achieved, thereby satisfying the expression (2). $(r_{21}+r_{22})/(r_{21}-r_{22})=-1.02$ was achieved, thereby satisfying the expression (3). $f/f_3=2.38$ was achieved, thereby satisfying the expression (4). $(r_{41}+r_{42})/(r_{41}-$ was achieved, thereby satisfying the expression (5).

Figure 13:
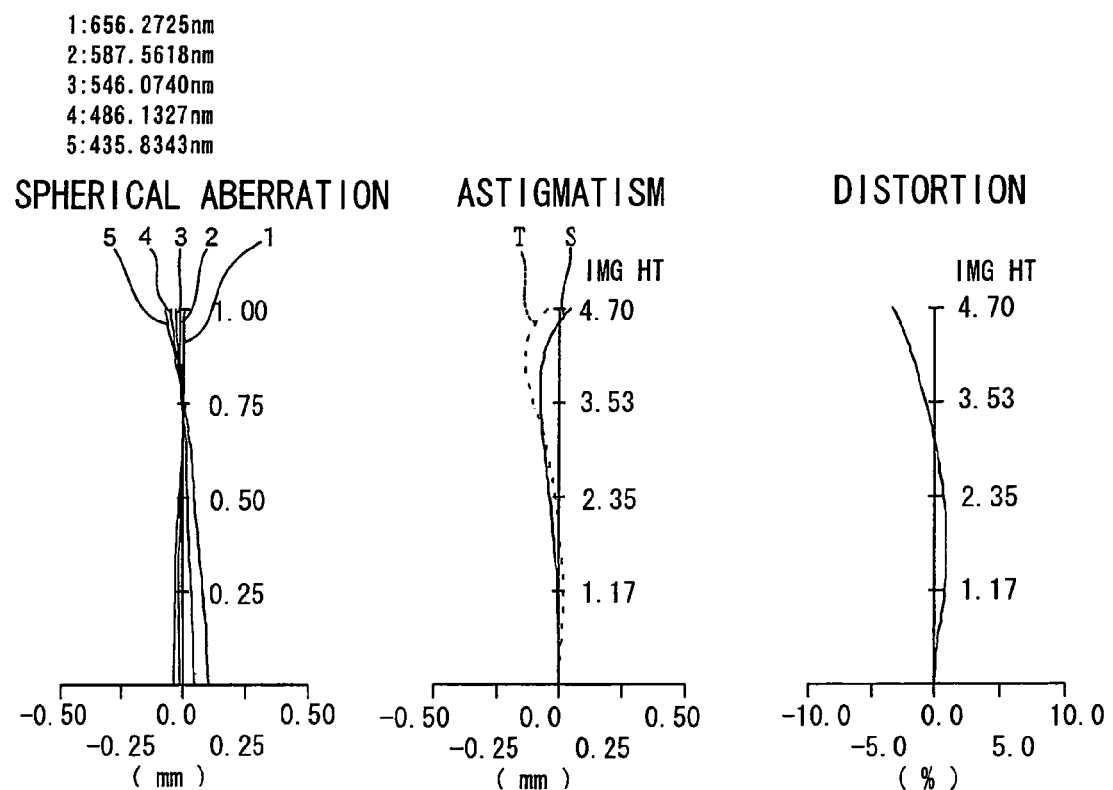
FIG. 13 shows graphs for describing the spherical aberration, astigmatism, and distortion of the imaging lens shown in FIG. 12.

FIG. 13 shows the spherical aberration, astigmatism, and distortion in the imaging lens 1 of the SIXTH EXAMPLE.

According to the result, each of the spherical aberration, astigmatism, and distortion are almost satisfactory. It can be seen from the result that sufficient optical property can be obtained.

Seventh Example

Figure 14:
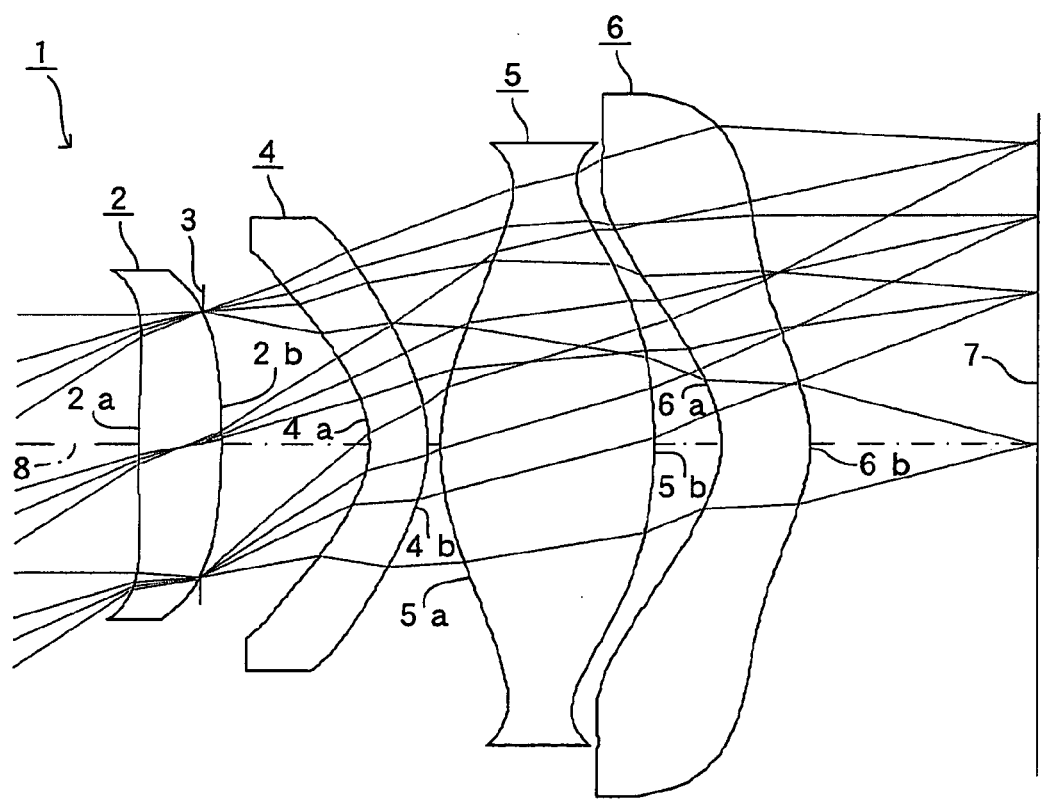
FIG. 14 is a schematic diagram for showing a SEVENTH EXAMPLE of the imaging lens and the imaging device according to the present invention.

FIG. 14 shows a SEVENTH EXAMPLE of the present invention. In this example as well, the center section of the second face 2b of the first lens 2 passes through the diaphragm 3 and is positioned closer to the image surface side than the diaphragm 3.

The imaging lens 1 of the SEVENTH EXAMPLE was set under the following conditions:

Lens Data
f = 8.00 mm, F no = 2.0, ω = 31.3°

| Face Number | r | d | nd | νd |
|---|---|---|---|---|
| (Object Point) | | INFINITY | | |
| 1 (First Face of First Lens) | 107.540 | 2.21 | 1.530 | 55.8 |
| 2 (Second Face of First Lens) | −4.814 | −0.41 | | |
| 3 (Diaphragm) | INFINITY | 1.52 | | |
| 4 (First Face of Second Lens) | −1.830 | 0.90 | 1.585 | 30.0 |
| 5 (Second Face of Second Lens) | −205.239 | 0.20 | | |
| 6 (First Face of Third Lens) | 2.155 | 3.30 | 1.530 | 55.8 |
| 7 (Second Face of Third Lens) | −4.878 | 2.13 | | |
| 8 (First Face of Fourth Lens) | −1.620 | 1.15 | 1.585 | 30.0 |
| 9 (Second Face of Fourth Lens) | −2.246 | | | |

| Face Number | k | A | B | C | D |
|---|---|---|---|---|---|
| 1 | 0.000 | −0.2355E−02 | −0.2698E−03 | 0.3259E−04 | −0.4696E−05 |
| 2 | −5.080 | −0.4719E−03 | −0.1033E−02 | 0.1293E−03 | −0.8254E−05 |
| 4 | −5.542 | −0.9191E−03 | −0.1219E−02 | 0.1552E−03 | −0.1429E−04 |
| 5 | 4399.654 | 0.6520E−03 | −0.8013E−03 | 0.4652E−04 | −0.1919E−05 |
| 6 | −6.017 | 0.3262E−02 | −0.3250E−03 | 0.2113E−04 | −0.8036E−06 |
| 7 | −1.426 | 0.1944E−02 | −0.2106E−04 | 0.6475E−05 | −0.2033E−06 |
| 8 | −1.047 | 0.1958E−01 | −0.8917E−03 | 0.3346E−04 | −0.6053E−06 |
| 9 | −0.922 | 0.1325E−01 | −0.5191E−04 | −0.9065E−05 | 0.1396E−06 |

Lens Data
f = 8.00 mm, F no = 2.0, ω = 32.6°

| Face Number | r | d | nd | νd |
|---|---|---|---|---|
| (Object Point) | | INFINITY | | |
| 1 (First Face of First Lens) | 18.228 | 1.31 | 1.530 | 55.8 |
| 2 (Second Face of First Lens) | −10.831 | −0.33 | | |
| 3 (Diaphragm) | INFINITY | 2.61 | | |
| 4 (First Face of Second Lens) | −1.574 | 0.90 | 1.585 | 30.0 |
| 5 (Second Face of Second Lens) | −2.478 | 0.20 | | |
| 6 (First Face of Third Lens) | 3.693 | 3.30 | 1.530 | 55.8 |
| 7 (Second Face of Third Lens) | −7.130 | 1.04 | | |
| 8 (First Face of Fourth Lens) | −1.793 | 1.37 | 1.585 | 30.0 |
| 9 (Second Face of Fourth Lens) | −2.640 | | | |

| Face Number | k | A | B | C | D |
|---|---|---|---|---|---|
| 1 | 0.000 | −0.4549E−02 | −0.8814E−03 | 0.1124E−03 | −0.1893E−04 |
| 2 | 17.179 | −0.5510E−02 | 0.1790E−03 | −0.9388E−04 | 0.1307E−04 |
| 4 | −0.910 | 0.3589E−01 | −0.5589E−02 | 0.6831E−03 | −0.3464E−04 |
| 5 | −0.756 | 0.1450E−01 | −0.1180E−02 | 0.1054E−03 | −0.4629E−05 |
| 6 | −5.305 | 0.1323E−02 | −0.1512E−03 | 0.4060E−05 | −0.1591E−06 |
| 7 | 1.012 | −0.1882E−02 | −0.3306E−04 | 0.1417E−04 | −0.1430E−06 |
| 8 | −1.716 | 0.8382E−02 | −0.8540E−03 | 0.5212E−04 | −0.1063E−05 |
| 9 | −0.771 | 0.1790E−01 | −0.6635E−03 | 0.1070E−04 | 0.1233E−07 |

Under such conditions, $f/f_1=0.61$ was achieved, thereby satisfying the expression (1). $f/f_2=-0.69$ was achieved, thereby satisfying the expression (2). $(r_{21}+r_{22})/(r_{21}-r_{22})=-4.48$ was achieved, thereby satisfying the expression (3). $f/f_3=1.56$ was achieved, thereby satisfying the expression (4). $(r_{41}+r_{42})/(r_{41}-r_{42})=-5.23$ was achieved, thereby satisfying the expression (5).

Figure 15:
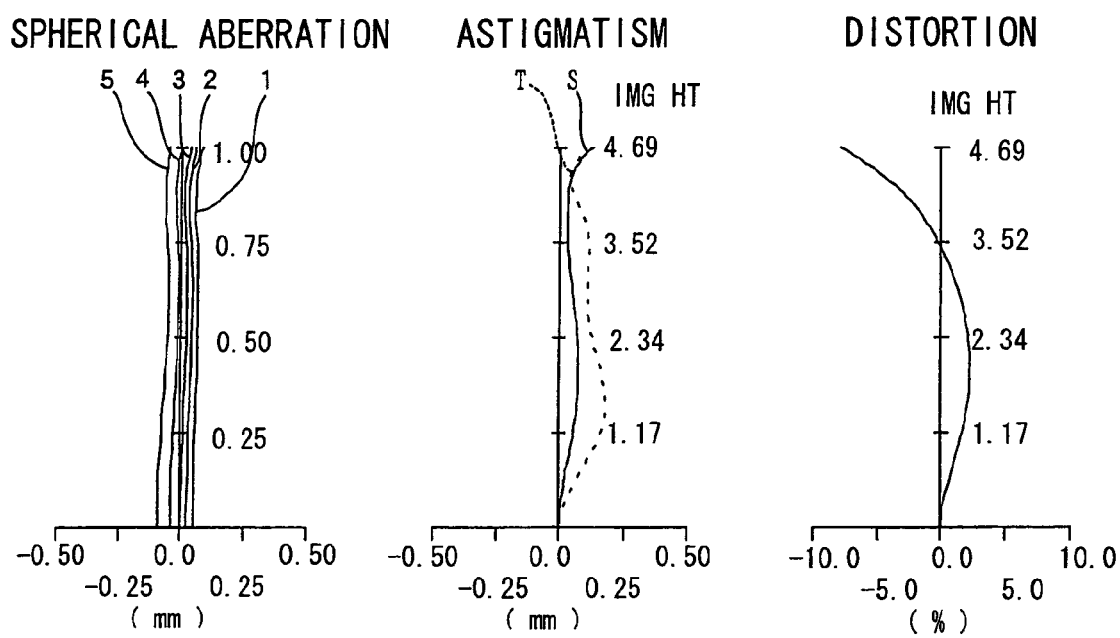
FIG. 15 shows graphs for describing the spherical aberration, astigmatism, and distortion of the imaging lens shown in FIG. 14.

FIG. 15 shows the spherical aberration, astigmatism, and distortion in the imaging lens 1 of the SEVENTH EXAMPLE.

According to the result, each of the spherical aberration, astigmatism, and distortion are almost satisfactory. It can be seen from the result that sufficient optical property can be obtained.

Eighth Example

Figure 16:
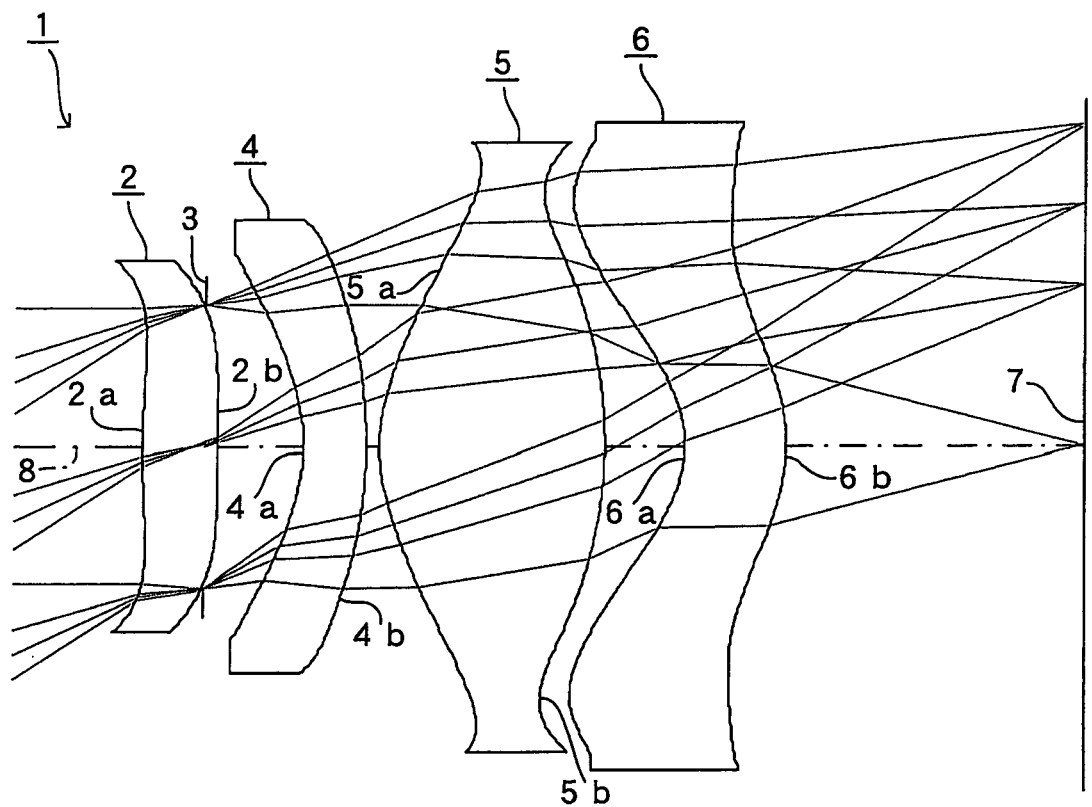
FIG. 16 is a schematic diagram for showing an EIGHTH EXAMPLE of the imaging lens and the imaging device according to the present invention.

FIG. 16 shows an EIGHTH EXAMPLE of the present invention. In this example as well, the center section of the second face 2b of the first lens 2 passes through the diaphragm 3 and is positioned closer to the image surface side than the diaphragm 3.

The imaging lens 1 of the EIGHTH EXAMPLE was set under the following conditions:

Lens Data
f = 8.00 mm, F no = 2.0, ω = 32.1°

| Face Number | r | d | nd | νd |
|---|---|---|---|---|
| (Object Point) | | INFINITY | | |
| 1 (First Face of First Lens) | 13.362 | 1.11 | 1.530 | 55.8 |
| 2 (Second Face of First Lens) | −104.564 | −0.20 | | |
| 3 (Diaphragm) | INFINITY | 1.45 | | |
| 4 (First Face of Second Lens) | −2.447 | 0.90 | 1.585 | 30.0 |
| 5 (Second Face of Second Lens) | −7.954 | 0.20 | | |
| 6 (First Face of Third Lens) | 2.440 | 3.30 | 1.530 | 55.8 |
| 7 (Second Face of Third Lens) | −5.735 | 1.17 | | |
| 8 (First Face of Fourth Lens) | −1.649 | 1.49 | 1.585 | 30.0 |
| 9 (Second Face of Fourth Lens) | −2.603 | | | |

| Face Number | k | A | B | C | D |
|---|---|---|---|---|---|
| 1 | 0.000 | −0.5551E−02 | −0.1123E−02 | 0.7362E−04 | −0.8580E−05 |
| 2 | 632.562 | −0.6379E−02 | −0.1953E−02 | 0.2413E−03 | −0.1103E−04 |
| 4 | −7.114 | −0.5193E−02 | −0.1169E−02 | 0.3359E−03 | −0.2072E−04 |
| 5 | 1.643 | −0.2444E−02 | −0.1224E−04 | 0.8665E−04 | −0.6835E−05 |
| 6 | −5.716 | 0.3618E−02 | −0.4183E−03 | 0.2396E−04 | −0.7093E−06 |
| 7 | −7.963 | −0.1691E−02 | −0.3771E−03 | 0.4613E−04 | −0.9802E−06 |

-continued

Lens Data
f = 8.00 mm, F no = 2.0, ω = 32.1°

| | | | | | |
|---|---|---|---|---|---|
| 8 | −1.384 | 0.1397E−01 | −0.1145E−02 | 0.6924E−04 | −0.1489E−05 |
| 9 | −1.005 | 0.1291E−01 | −0.2256E−04 | −0.2438E−04 | 0.6269E−06 |

Under such conditions, $f/f_1=0.36$ was achieved, thereby satisfying the expression (1). $f/f_2=-1.25$ was achieved, thereby satisfying the expression (2). $(r_{21}+r_{22})/(r_{21}-r_{22})=-1.89$ was achieved, thereby satisfying the expression (3). $f/f_3=2.14$ was achieved, thereby satisfying the expression (4). $(r_{41}+r_{42})/(r_{41}-r_{42})=-4.45$ was achieved, thereby satisfying the expression (5).

Figure 17:
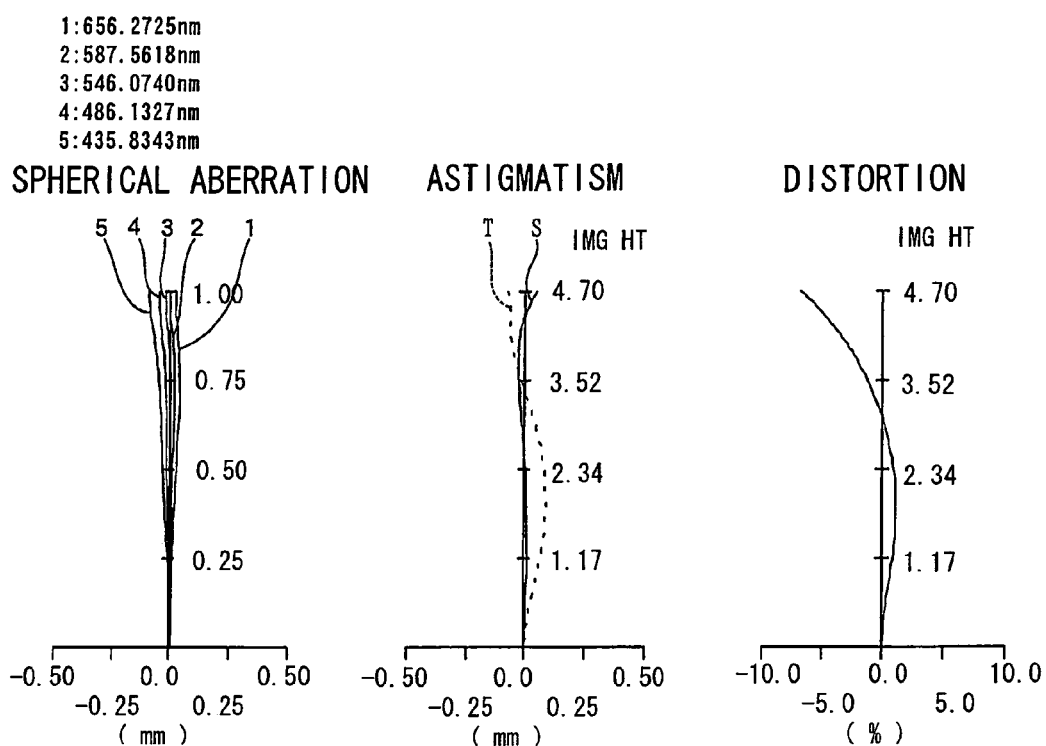
FIG. 17 shows graphs for describing the spherical aberration, astigmatism, and distortion of the imaging lens shown in FIG. 16.

FIG. 17 shows the spherical aberration, astigmatism, and distortion in the imaging lens 1 of the EIGHTH EXAMPLE.

According to the result, each of the spherical aberration, astigmatism, and distortion are almost satisfactory. It can be seen from the result that sufficient optical property can be obtained.

Ninth Example

Figure 18:
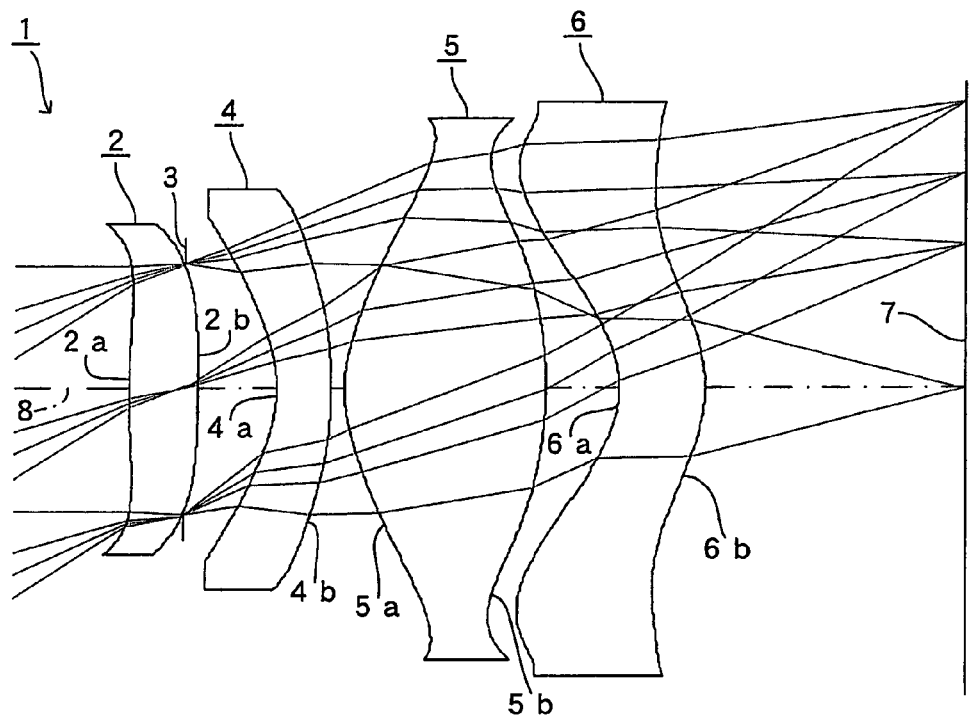
FIG. 18 is a schematic diagram for showing a NINTH EXAMPLE of the imaging lens and the imaging device according to the present invention.

FIG. 18 shows a NINTH EXAMPLE of the present invention. In this example as well, the center section of the second face 2b of the first lens 2 passes through the diaphragm 3 and is positioned closer to the image surface side than the diaphragm 3.

The imaging lens 1 of the NINTH EXAMPLE was set under the following conditions:

Under such conditions, $f/f_1=0.46$ was achieved, thereby satisfying the expression (1). $f/f_2=-1.34$ was achieved, thereby satisfying the expression (2). $(r_{21}+r_{22})/(r_{21}-r_{22})=-2.01$ was achieved; thereby satisfying the expression (3). $f/f_3=2.11$ was achieved, thereby satisfying the expression (4). $(r_{41}+r_{42})/(r_{41}-r_{42})=-4.68$ was achieved, thereby satisfying the expression (5).

Figure 19:
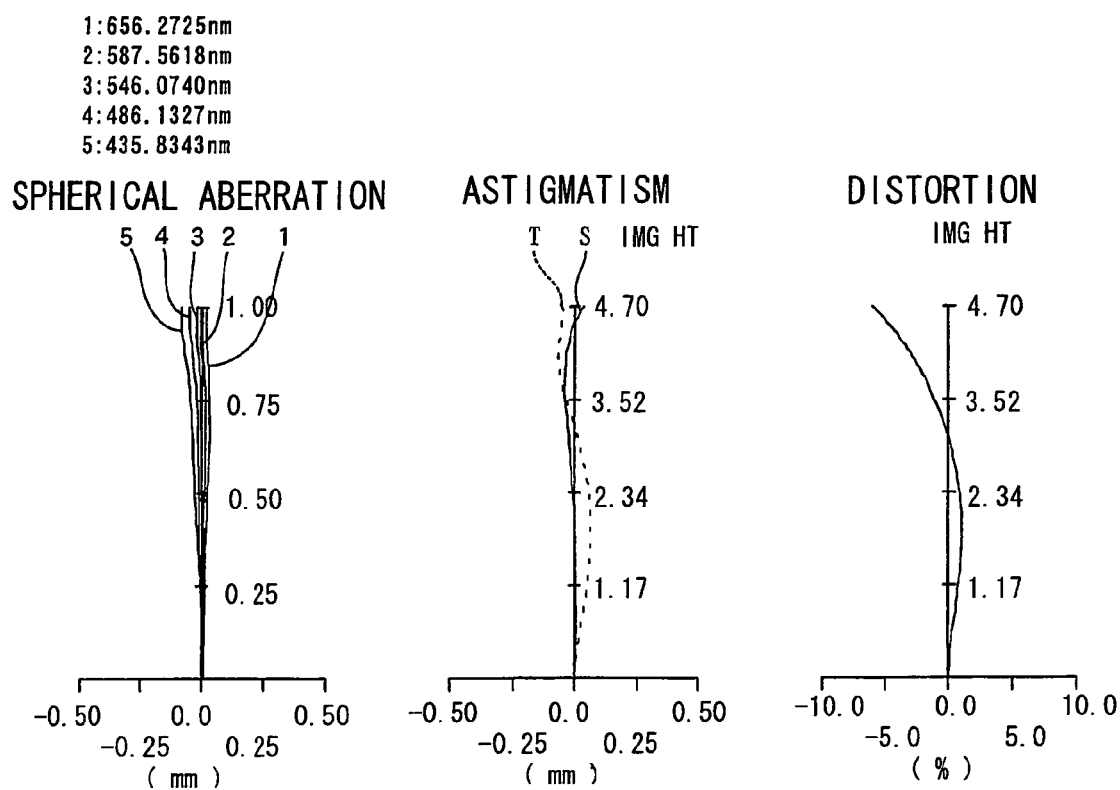
FIG. 19 shows graphs for describing the spherical aberration, astigmatism, and distortion of the imaging lens shown in FIG. 18.

FIG. 19 shows the spherical aberration, astigmatism, and distortion in the imaging lens 1 of the NINTH EXAMPLE.

According to the result, each of the spherical aberration, astigmatism, and distortion are almost satisfactory. It can be seen from the result that sufficient optical property can be obtained.

Tenth Example

Figure 20:
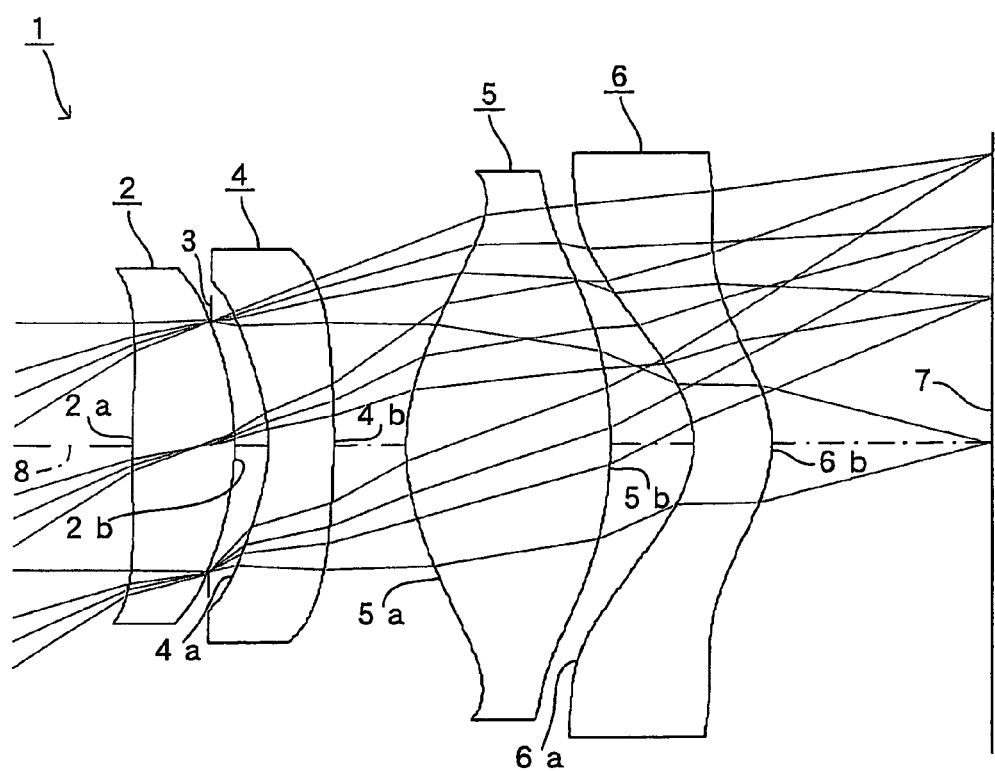
FIG. 20 is a schematic diagram for showing a TENTH EXAMPLE of the imaging lens and the imaging device according to the present invention.

FIG. 20 shows a TENTH EXAMPLE of the present invention. In this example as well, the center section of the second face 2b of the first lens 2 passes through the diaphragm 3 and is positioned closer to the image surface side than the diaphragm 3.

The imaging lens 1 of the TENTH EXAMPLE was set under the following conditions:

Lens Data
f = 8.00 mm, F no = 2.0, ω = 32.0°

| Face Number | r | d | nd | vd |
|---|---|---|---|---|
| (Object Point) | | INFINITY | | |
| 1 (First Face of First Lens) | 12.698 | 1.14 | 1.532 | 55.8 |
| 2 (Second Face of First Lens) | −34.050 | −0.22 | | |
| 3 (Diaphragm) | INFINITY | 1.50 | | |
| 4 (First Face of Second Lens) | −2.156 | 0.90 | 1.589 | 30.0 |
| 5 (Second Face of Second Lens) | −6.419 | 0.20 | | |
| 6 (First Face of Third Lens) | 2.469 | 3.30 | 1.532 | 55.8 |
| 7 (Second Face of Third Lens) | −5.957 | 1.21 | | |
| 8 (First Face of Fourth Lens) | −1.656 | 1.41 | 1.589 | 30.0 |
| 9 (Second Face of Fourth Lens) | −2.557 | | | |

| Face Number | k | A | B | C | D |
|---|---|---|---|---|---|
| 1 | 0.000 | −0.5025E−02 | −0.9804E−03 | 0.5930E−04 | −0.9508E−05 |
| 2 | 84.006 | −0.6170E−02 | −0.1548E−02 | 0.1848E−03 | −0.8978E−05 |
| 4 | −5.612 | −0.7510E−02 | −0.2852E−03 | 0.2486E−03 | −0.1916E−04 |
| 5 | 0.484 | −0.7726E−03 | 0.1530E−04 | 0.7669E−04 | −0.6666E−05 |
| 6 | −5.884 | 0.3749E−02 | −0.4262E−03 | 0.2358E−04 | −0.6708E−06 |
| 7 | −8.583 | −0.1808E−02 | −0.3793E−03 | 0.4526E−04 | −0.9369E−06 |
| 8 | −1.364 | 0.1396E−01 | −0.1121E−02 | 0.6747E−04 | −0.1455E−05 |
| 9 | −1.008 | 0.1298E−01 | −0.1539E−04 | −0.2416E−04 | 0.6083E−06 |

Lens Data
f = 8.00 mm, F no = 2.0, ω = 32.1°

| Face Number | r | d | nd | vd |
|---|---|---|---|---|
| (Object Point) | | INFINITY | | |
| 1 (First Face of First Lens) | 36.011 | 1.70 | 1.532 | 55.8 |
| 2 (Second Face of First Lens) | −4.059 | −0.40 | | |
| 3 (Diaphragm) | INFINITY | 0.96 | | |
| 4 (First Face of Second Lens) | −2.529 | 1.50 | 1.589 | 30.0 |
| 5 (Second Face of Second Lens) | −12.500 | 1.17 | | |
| 6 (First Face of Third Lens) | 3.549 | 3.30 | 1.532 | 55.8 |
| 7 (Second Face of Third Lens) | −6.139 | 1.40 | | |
| 8 (First Face of Fourth Lens) | −1.521 | 1.27 | 1.589 | 30.0 |
| 9 (Second Face of Fourth Lens) | −2.279 | | | |

| Face Number | k | A | B | C | D |
|---|---|---|---|---|---|
| 1 | 0.000 | −0.2934E−02 | −0.3400E−03 | 0.4499E−04 | −0.5812E−05 |
| 2 | −8.418 | −0.1481E−02 | −0.3665E−03 | 0.5301E−05 | −0.1484E−05 |
| 4 | −6.688 | 0.1879E−02 | −0.8307E−03 | 0.5821E−04 | −0.7281E−05 |
| 5 | −219.024 | 0.5906E−03 | −0.1123E−02 | 0.1174E−03 | −0.6193E−05 |
| 6 | −3.008 | 0.5213E−04 | −0.6477E−05 | −0.2243E−05 | −0.1180E−06 |
| 7 | −6.273 | −0.1330E−02 | −0.3313E−03 | 0.4091E−04 | −0.1082E−05 |
| 8 | −1.207 | 0.1684E−01 | −0.1151E−02 | 0.5884E−04 | −0.1278E−05 |
| 9 | −1.093 | 0.1358E−01 | −0.5831E−04 | −0.2299E−04 | 0.5443E−06 |

Under such conditions, $f/f_1=1.15$ was achieved, thereby satisfying the expression (1). $f/f_2=-1.43$ was achieved, thereby satisfying the expression (2). $(r_{21}+r_{22})/(r_{21}-r_{22})=-1.51$ was achieved, thereby satisfying the expression (3). $f/f_3=1.67$ was achieved, thereby satisfying the expression (4). $(r_{41}+r_{42})/(r_{41}-$ was achieved, thereby satisfying the expression (5).

Figure 21:
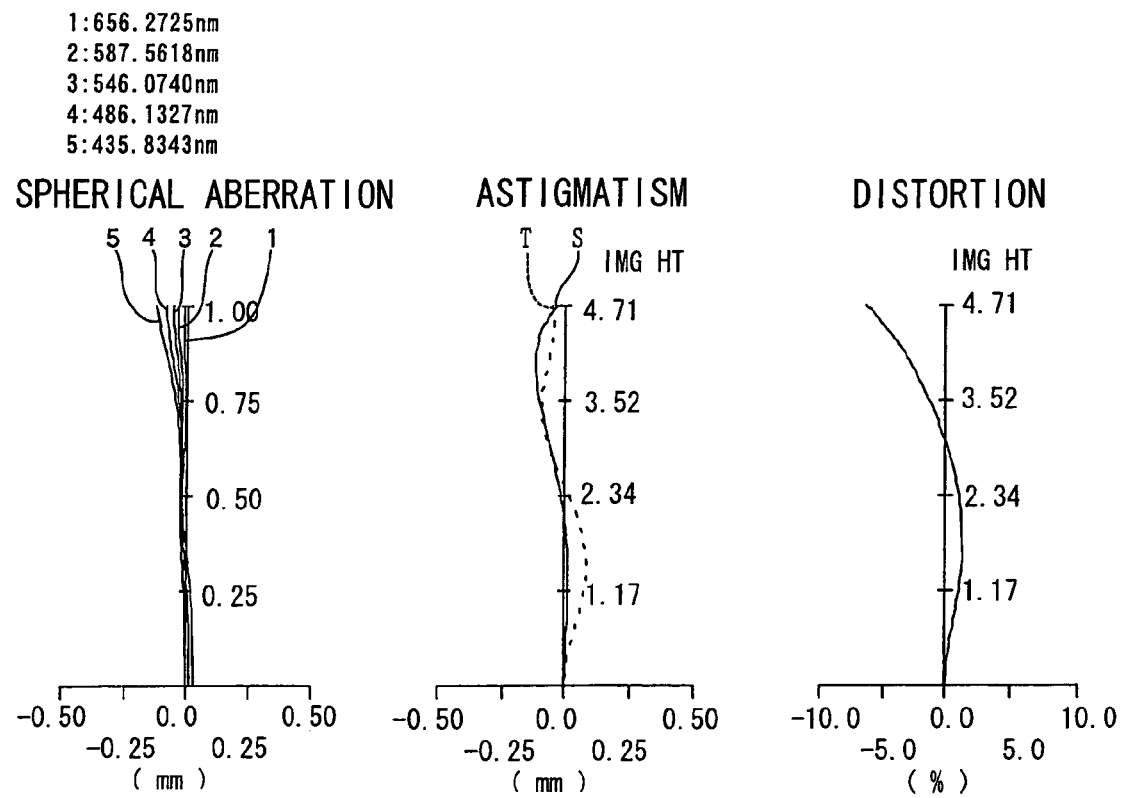
FIG. 21 shows graphs for describing the spherical aberration, astigmatism, and distortion of the imaging lens shown in FIG. 20.

FIG. 21 shows the spherical aberration, astigmatism, and distortion in the imaging lens 1 of the TENTH EXAMPLE.

According to the result, each of the spherical aberration, astigmatism, and distortion are almost satisfactory. It can be seen from the result that sufficient optical property can be obtained.

Eleventh Example

Figure 22:
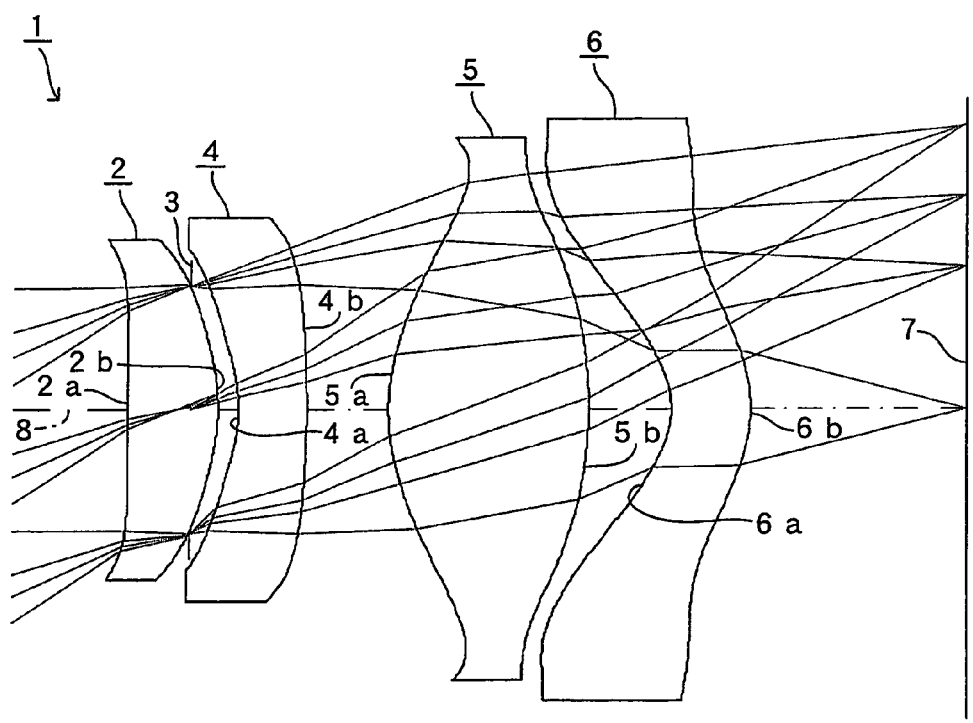
FIG. 22 is a schematic diagram for showing a ELEVENTH EXAMPLE of the imaging lens and the imaging device according to the present invention.

FIG. 22 shows an ELEVENTH EXAMPLE of the present invention. In this example as well, the center section of the second face 2b of the first lens 2 passes through the diaphragm 3 and is positioned closer to the image surface side than the diaphragm 3.

The imaging lens 1 of the ELEVENTH EXAMPLE was set under the following conditions:

Lens Data
f = 8.00 mm, F no = 2.0, ω = 32.5°

| Face Number | r | d | nd | vd |
|---|---|---|---|---|
| (Object Point) | | INFINITY | | |
| 1 (First Face of First Lens) | 33.159 | 1.49 | 1.532 | 55.8 |
| 2 (Second Face of First Lens) | −3.430 | −0.44 | | |
| 3 (Diaphragm) | INFINITY | 0.79 | | |
| 4 (First Face of Second Lens) | −2.438 | 1.14 | 1.589 | 30.0 |
| 5 (Second Face of Second Lens) | −12.500 | 1.36 | | |
| 6 (First Face of Third Lens) | 3.704 | 3.30 | 1.532 | 55.8 |
| 7 (Second Face of Third Lens) | −6.717 | 1.34 | | |
| 8 (First Face of Fourth Lens) | −1.500 | 1.32 | 1.589 | 30.0 |
| 9 (Second Face of Fourth Lens) | −2.358 | | | |

| Face Number | k | A | B | C | D |
|---|---|---|---|---|---|
| 1 | 0.000 | −0.3863E−02 | −0.4980E−03 | 0.5172E−04 | −0.6519E−05 |
| 2 | −8.859 | −0.5506E−03 | −0.6412E−03 | 0.2005E−04 | −0.2262E−05 |
| 4 | −7.165 | 0.3766E−02 | −0.9527E−03 | 0.6549E−04 | −0.6378E−05 |
| 5 | −234.151 | 0.2863E−03 | −0.1103E−02 | 0.1276E−03 | −0.6939E−05 |
| 6 | −2.352 | −0.7243E−03 | 0.3053E−04 | −0.2891E−05 | −0.1306E−06 |
| 7 | −8.653 | −0.1726E−02 | −0.3782E−03 | 0.4256E−04 | −0.1009E−05 |

-continued

Lens Data
f = 8.00 mm, F no = 2.0, ω = 32.5°

| | | | | |
|---|---|---|---|---|
| 8 | −1.244 | 0.1619E−01 | −0.1213E−02 | 0.6141E−04 | −0.1216E−05 |
| 9 | −1.101 | 0.1384E−01 | −0.7776E−04 | −0.2420E−04 | 0.6044E−06 |

Under such conditions, f/f=1.35 was achieved, thereby satisfying the expression (1). $f/f_2=-1.49$ was achieved, thereby satisfying the expression (2). $(r_{21}+r_{22})/(r_{21}-r_{22})=-1.48$ was achieved, thereby satisfying the expression (3). $f/f_3=1.59$ was achieved, thereby satisfying the expression (4). $(r_{41}+r_{42})/(r_{41}-r_{42})=-4.96$ was achieved, thereby satisfying the expression (5).

Figure 23:
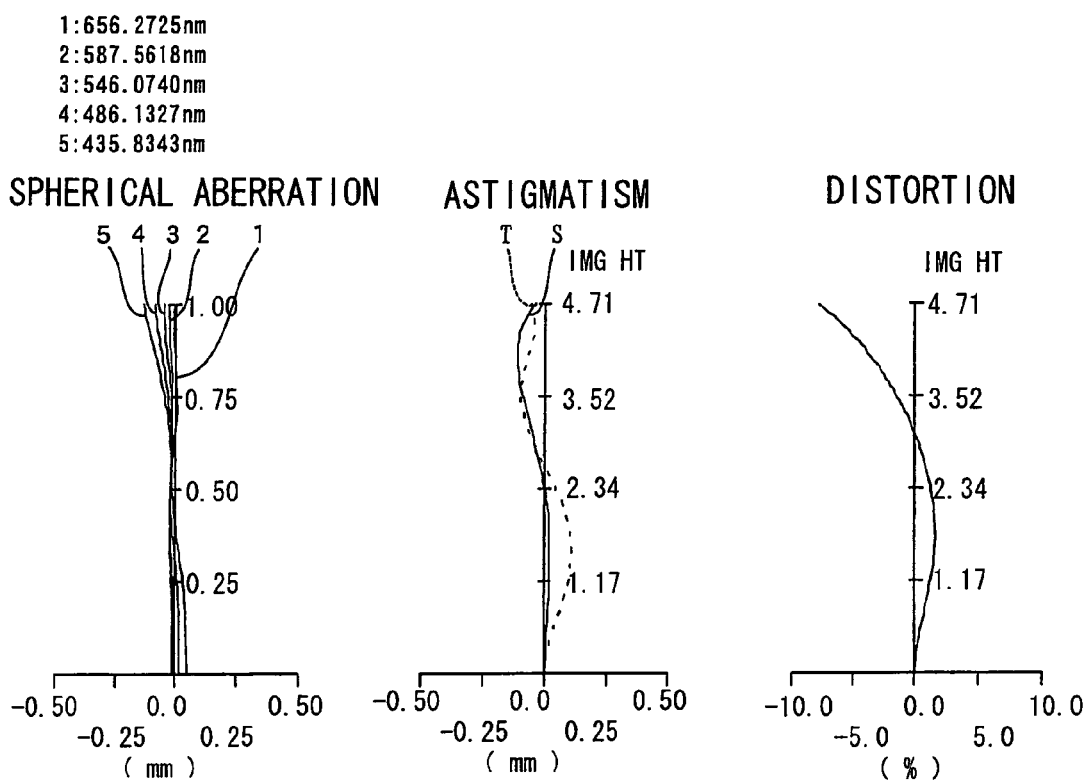
FIG. 23 shows graphs for describing the spherical aberration, astigmatism, and distortion of the imaging lens shown in FIG. 22.

FIG. 23 shows the spherical aberration, astigmatism, and distortion in the imaging lens 1 of the ELEVENTH EXAMPLE.

According to the result, each of the spherical aberration, astigmatism, and distortion are almost satisfactory. It can be seen from the result that sufficient optical property can be obtained.

Twelfth Example

Figure 24:
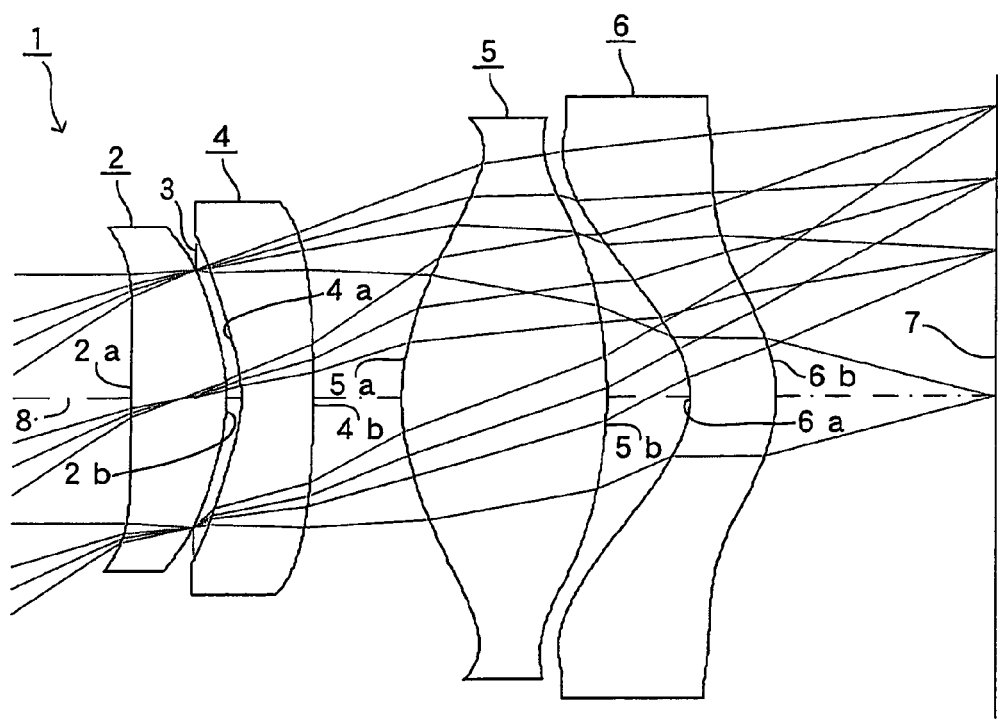
FIG. 24 is a schematic diagram for showing a TWELFTH EXAMPLE of the imaging lens and the imaging device according to the present invention.

FIG. 24 shows a TWELFTH EXAMPLE of the present invention. In this example as well, the center section of the second face 2b of the first lens 2 passes through the diaphragm 3 and is positioned closer to the image surface side than the diaphragm 3.

The imaging lens 1 of the TWELFTH EXAMPLE was set under the following conditions:

Under such conditions, f/f=1.55 was achieved, thereby satisfying the expression (1). $f/f_2=-1.63$ was achieved, thereby satisfying the expression (2). $(r_{21}+r_{22})/(r_{21}-r_{22})=-1.44$ was achieved, thereby satisfying the expression (3). $f/f_3=1.54$ was achieved, thereby satisfying the expression (4). $(r_{41}+r_{42})/(r_{41}-r_{42})=-5.04$ was achieved, thereby satisfying the expression (5).

Figure 25:
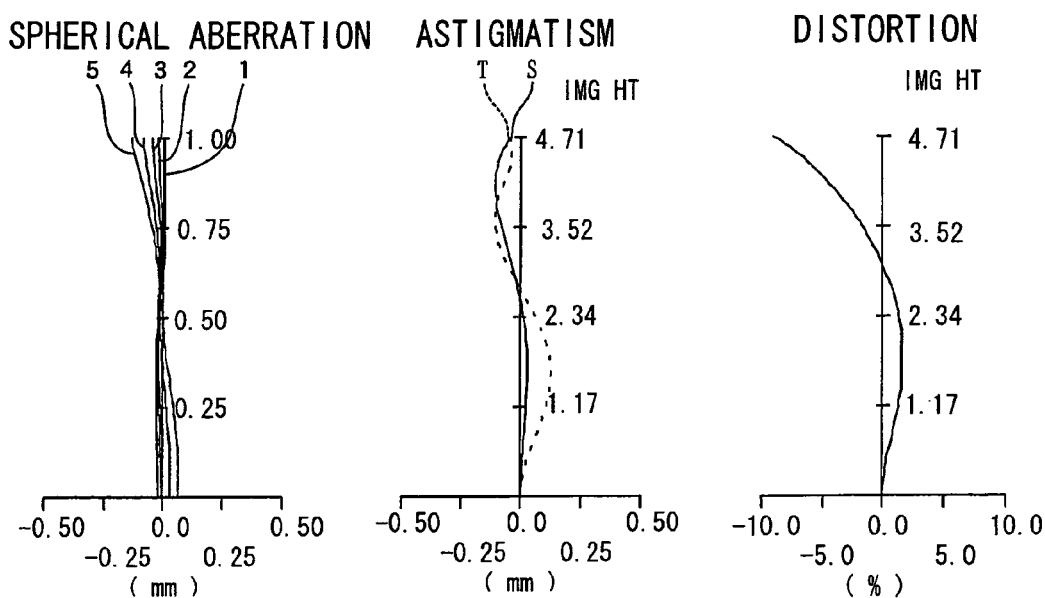
FIG. 25 shows graphs for describing the spherical aberration, astigmatism, and distortion of the imaging lens shown in FIG. 24.

FIG. 25 shows the spherical aberration, astigmatism, and distortion in the imaging lens 1 of the TWELFTH EXAMPLE.

According to the result, each of the spherical aberration, astigmatism, and distortion are almost satisfactory. It can be seen from the result that sufficient optical property can be obtained.

Thirteenth Example

Figure 26:
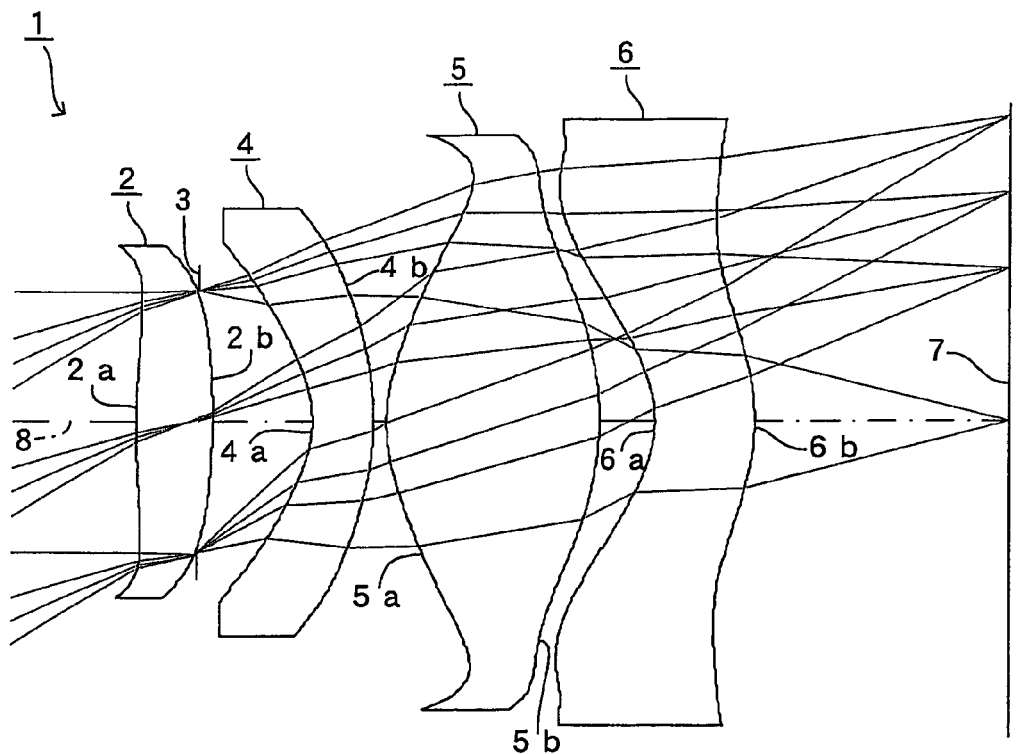
FIG. 26 is a schematic diagram for showing a THIRTEENTH EXAMPLE of the imaging lens and the imaging device according to the present invention.

FIG. 26 shows a THIRTEENTH EXAMPLE of the present invention. In this example as well, the center section of the second face 2b of the first lens 2 passes through the diaphragm 3 and is positioned closer to the image surface side than the diaphragm 3.

The imaging lens 1 of the THIRTEENTH EXAMPLE was set under the following conditions:

Lens Data
f = 8.00 mm, F no = 2.0, ω = 32.8°

| Face Number | r | d | nd | νd |
|---|---|---|---|---|
| (Object Point) | | INFINITY | | |
| 1 (First Face of First Lens) | 37.922 | 1.54 | 1.532 | 55.8 |
| 2 (Second Face of First Lens) | −2.919 | −0.50 | | |
| 3 (Diaphragm) | INFINITY | 0.74 | | |
| 4 (First Face of Second Lens) | −2.266 | 1.19 | 1.589 | 30.0 |
| 5 (Second Face of Second Lens) | −12.500 | 1.44 | | |
| 6 (First Face of Third Lens) | 3.756 | 3.30 | 1.532 | 55.8 |
| 7 (Second Face of Third Lens) | −7.356 | 1.35 | | |
| 8 (First Face of Fourth Lens) | −1.499 | 1.36 | 1.589 | 30.0 |
| 9 (Second Face of Fourth Lens) | −2.240 | 3.52 | | |

| Face Number | k | A | B | C | D |
|---|---|---|---|---|---|
| 1 | 0.000 | −0.4577E−02 | −0.5295E−03 | 0.2682E−04 | −0.3698E−05 |
| 2 | −8.457 | 0.1352E−02 | −0.1171E−02 | 0.4531E−04 | −0.2692E−06 |
| 4 | −7.235 | 0.5872E−02 | −0.1201E−02 | 0.6740E−04 | −0.2741E−05 |
| 5 | −258.121 | −0.2394E−03 | −0.9399E−03 | 0.1180E−03 | −0.6577E−05 |
| 6 | −1.799 | −0.1815E−02 | 0.8645E−04 | −0.5478E−05 | −0.5328E−07 |
| 7 | −9.307 | −0.1503E−02 | −0.4789E−03 | 0.4827E−04 | −0.1072E−05 |
| 8 | −1.240 | 0.1629E−01 | −0.1264E−02 | 0.6475E−04 | −0.1251E−05 |
| 9 | −1.086 | 0.1397E−01 | −0.6991E−04 | −0.2488E−04 | 0.6219E−06 |

Lens Data
f = 8.00 mm, F no = 2.0, ω = 31.4°

| Face Number | r | d | nd | νd |
|---|---|---|---|---|
| (Object Point) | | INFINITY | | |
| 1 (First Face of First Lens) | 11.298 | 1.20 | 1.532 | 55.8 |
| 2 (Second Face of First Lens) | −13.904 | −0.23 | | |
| 3 (Diaphragm) | INFINITY | 1.79 | | |
| 4 (First Face of Second Lens) | −1.732 | 0.90 | 1.589 | 30.0 |
| 5 (Second Face of Second Lens) | −4.595 | 0.20 | | |
| 6 (First Face of Third Lens) | 2.533 | 3.30 | 1.532 | 55.8 |
| 7 (Second Face of Third Lens) | −4.399 | 0.88 | | |
| 8 (First Face of Fourth Lens) | −1.754 | 1.54 | 1.589 | 30.0 |
| 9 (Second Face of Fourth Lens) | −3.157 | | | |

| Face Number | k | A | B | C | D |
|---|---|---|---|---|---|
| 1 | 0.000 | −0.3390E−02 | −0.6849E−03 | 0.7654E−04 | −0.1772E−04 |
| 2 | 0.563 | −0.4252E−02 | −0.5785E−03 | −0.1324E−05 | −0.1949E−05 |
| 4 | −3.914 | −0.6774E−02 | 0.9853E−03 | −0.2328E−03 | 0.1881E−04 |
| 5 | −3.206 | 0.2960E−02 | −0.4774E−03 | −0.1083E−04 | 0.1569E−05 |
| 6 | −6.226 | 0.4425E−02 | −0.5031E−03 | 0.3589E−04 | −0.1414E−05 |
| 7 | −1.406 | 0.1208E−02 | −0.1331E−03 | 0.3874E−04 | −0.1554E−05 |
| 8 | −1.369 | 0.1395E−01 | −0.1043E−02 | 0.6443E−04 | −0.1569E−05 |
| 9 | −0.792 | 0.1364E−01 | −0.2410E−03 | −0.9921E−05 | 0.3547E−06 |

Under such conditions, $f/f_1=0.67$ was achieved, thereby satisfying the expression (1). $f/f_2=-1.50$ was achieved, thereby satisfying the expression (2). $(r_{21}+r_{22})/(r_{21}-r_{22})=-2.21$ was achieved, thereby satisfying the expression (3). $f/f_3=2.21$ was achieved, thereby satisfying the expression (4). $(r_{41}+r_{42})/(r_{41}-$ was achieved, thereby satisfying the expression (5).

Figure 27:
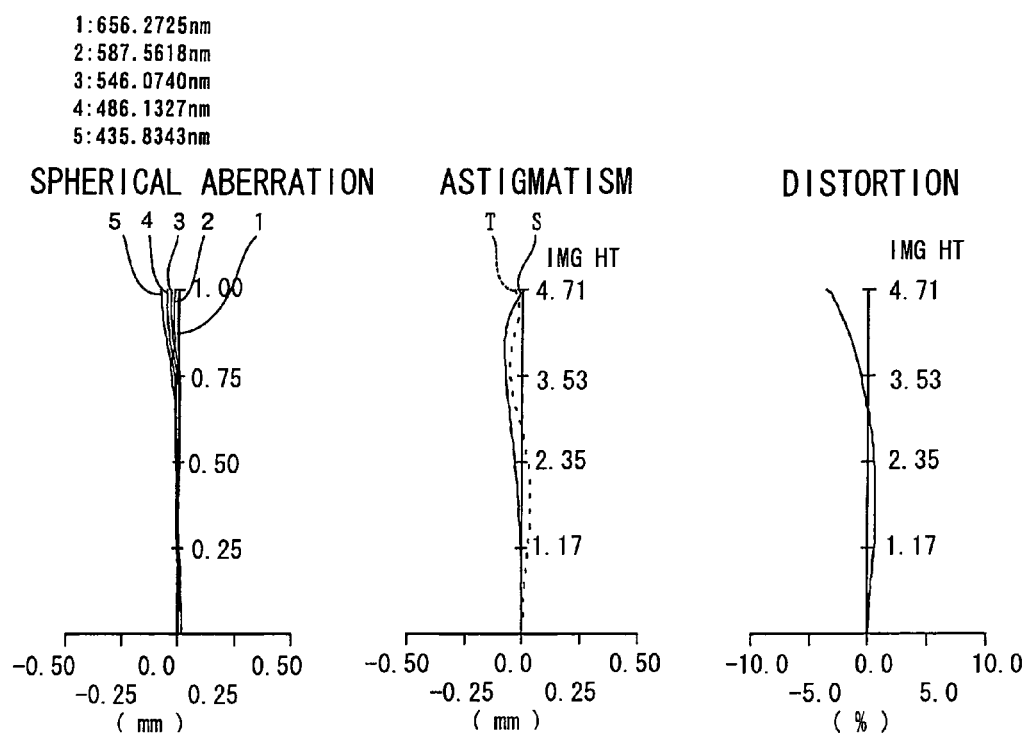
FIG. 27 shows graphs for describing the spherical aberration, astigmatism, and distortion of the imaging lens shown in FIG. 26.

FIG. 27 shows the spherical aberration, astigmatism, and distortion in the imaging lens 1 of the THIRTEENTH EXAMPLE.

According to the result, each of the spherical aberration, astigmatism, and distortion are almost satisfactory. It can be seen from the result that sufficient optical property can be obtained.

Fourteenth Example

Figure 28:
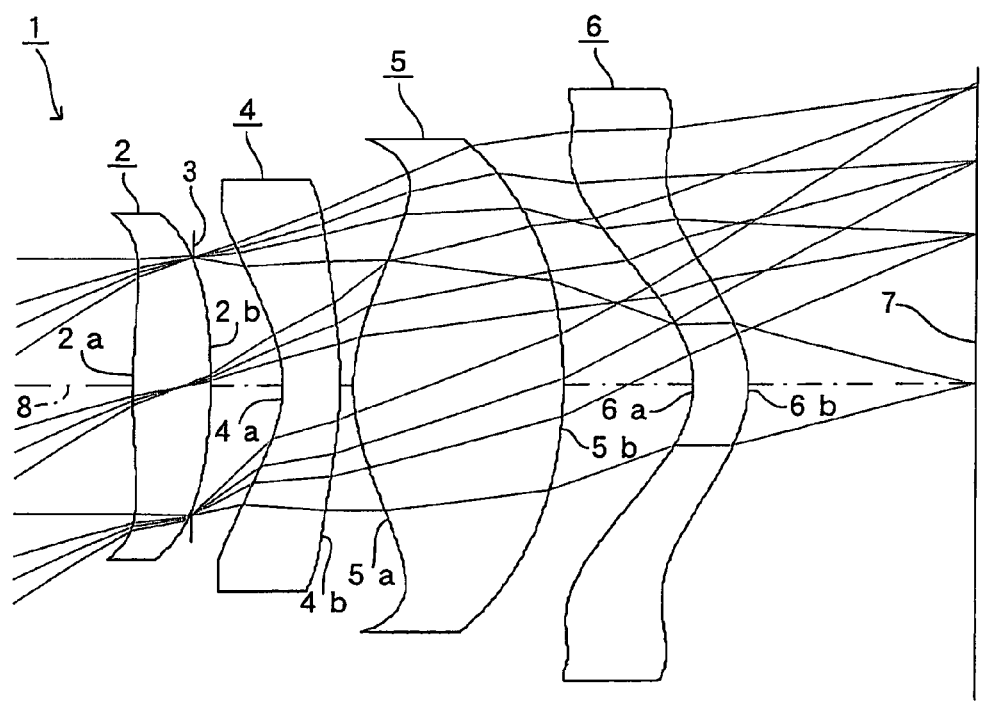
FIG. 28 is a schematic diagram for showing a FOURTEENTH EXAMPLE of the imaging lens and the imaging device according to the present invention.

FIG. 28 shows a FOURTEENTH EXAMPLE of the present invention. In this example as well, the center section of the second face 2b of the first lens 2 passes through the diaphragm 3 and is positioned closer to the image surface side than the diaphragm 3.

The imaging lens 1 of the FOURTEENTH EXAMPLE was set under the following conditions:

Lens Data
f = 8.00 mm, F no = 2.0, ω = 31.9°

| Face Number | r | d | nd | νd |
|---|---|---|---|---|
| (Object Point) | | INFINITY | | |
| 1 (First Face of First Lens) | 10.920 | 1.24 | 1.532 | 55.8 |
| 2 (Second Face of First Lens) | −12.733 | −0.28 | | |
| 3 (Diaphragm) | INFINITY | 1.43 | | |
| 4 (First Face of Second Lens) | −1.886 | 0.90 | 1.589 | 30.0 |
| 5 (Second Face of Second Lens) | −6.925 | 0.20 | | |
| 6 (First Face of Third Lens) | 2.597 | 3.30 | 1.532 | 55.8 |
| 7 (Second Face of Third Lens) | −6.899 | 2.03 | | |
| 8 (First Face of Fourth Lens) | −1.456 | 0.88 | 1.589 | 30.0 |
| 9 (Second Face of Fourth Lens) | −1.872 | | | |

| Face Number | k | A | B | C | D |
|---|---|---|---|---|---|
| 1 | 0.000 | −0.4693E−02 | −0.8568E−03 | 0.4296E−04 | −0.1015E−04 |
| 2 | 8.108 | −0.5643E−02 | −0.1113E−02 | 0.1770E−03 | −0.1318E−04 |
| 4 | −4.630 | −0.6114E−02 | 0.1741E−02 | −0.1704E−03 | 0.6757E−05 |
| 5 | −2.796 | 0.3830E−02 | 0.3400E−03 | −0.6656E−04 | 0.1405E−05 |
| 6 | −6.945 | 0.2951E−02 | −0.4848E−03 | 0.2730E−04 | −0.1859E−05 |
| 7 | −2.390 | −0.2442E−03 | −0.5025E−03 | 0.3790E−04 | −0.1045E−05 |

-continued

Lens Data
f = 8.00 mm, F no = 2.0, ω = 31.9°

| 8 | −1.018 | 0.1936E−01 | −0.6777E−03 | 0.3358E−04 | −0.9593E−06 |
| 9 | −1.039 | 0.1286E−01 | 0.1547E−03 | −0.2024E−04 | 0.1914E−06 |

Under such conditions, $f/f_1=0.71$ was achieved, thereby satisfying the expression (1). $f/f_2=-1.70$ was achieved, thereby satisfying the expression (2). $(r_{21}+r_{22})/(r_{21}-r_{22})=-1.75$ was achieved, thereby satisfying the expression (3). $f/f_3=1.98$ was achieved, thereby satisfying the expression (4). $(r_{41}+r_{42})/(r_{41}-$ was achieved, thereby satisfying the expression (5).

Figure 29:
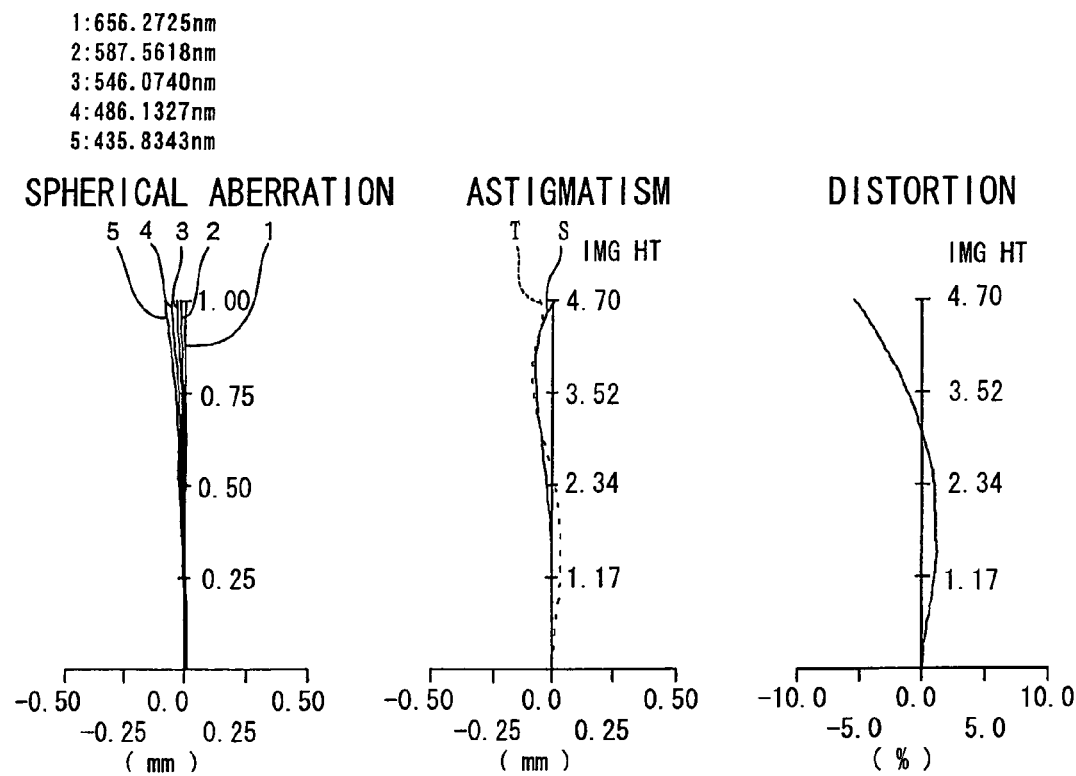
FIG. 29 shows graphs for describing the spherical aberration, astigmatism, and distortion of the imaging lens shown in FIG. 28.

FIG. 29 shows the spherical aberration, astigmatism, and distortion in the imaging lens 1 of the FOURTEENTH EXAMPLE.

According to the result, each of the spherical aberration, astigmatism, and distortion are almost satisfactory. It can be seen from the result that sufficient optical property can be obtained.

The present invention is not limited to the above-described embodiment. Various modifications can be made as required.

What is claimed is:

1. An imaging lens comprising:
in order from an object side to an image surface side, a first lens having a positive power whose convex surface faces the image surface side, a diaphragm, a second lens having a negative power whose convex surface faces the image surface side, a third lens having a positive power, and a fourth lens having a negative power, wherein conditions expressed by following expressions (1) and (2) are to be satisfied:

$$0.3 \leq f/f_1 \leq 1.7 \quad (1)$$

$$-2.7 \leq f/f_2 \leq -0.25 \quad (2)$$

where,
f: focal distance of the entire lens system
$f_1$: focal distance of the first lens
$f_2$: focal distance of the second lens.

2. The imaging lens according to claim 1, wherein:
a condition expressed by a following expression (3) is to be further satisfied:

$$-7.0 \leq (r_{21}+r_{22})/(r_{21}-r_{22}) \leq -1.2 \quad (3)$$

where,
$r_{21}$: center radius curvature of the object side face of the second lens
$r_{22}$: center radius curvature of the image surface side face of the second lens 3. The imaging lens according to claim 1, wherein:
a condition expressed by a following expression (4) is to be further satisfied:

$$0.8 \leq f/f_3 \leq 3.0 \quad (4)$$

where,
$f_3$: focal distance of the third lens.

4. The imaging lens according to claim 1, wherein:
the fourth lens is a meniscus lens whose concave surface faces the image surface side and a condition expressed by a following expression (5) is to be further satisfied:

$$-10.0 \leq (r_{41}+r_{42})/(r_{41}-r_{42}) \leq -2.5 \quad (5)$$

where,
$r_{41}$: center radius curvature of the object side face of the fourth lens
$r_{42}$: center radius curvature of the image surface side face of the fourth lens.

5. The imaging lens according to any one of claims 1 to 4, wherein:
the object side surface of the first lens is formed in an aspheric shape that is concave towards the object side, towards a peripheral side.

* * * * *